Nov. 17, 1953   L. M. PERSONS   2,659,851
REVERSING AND SPEED CONTROL FOR TRUCK MOTORS
Filed July 30, 1948   8 Sheets-Sheet 2
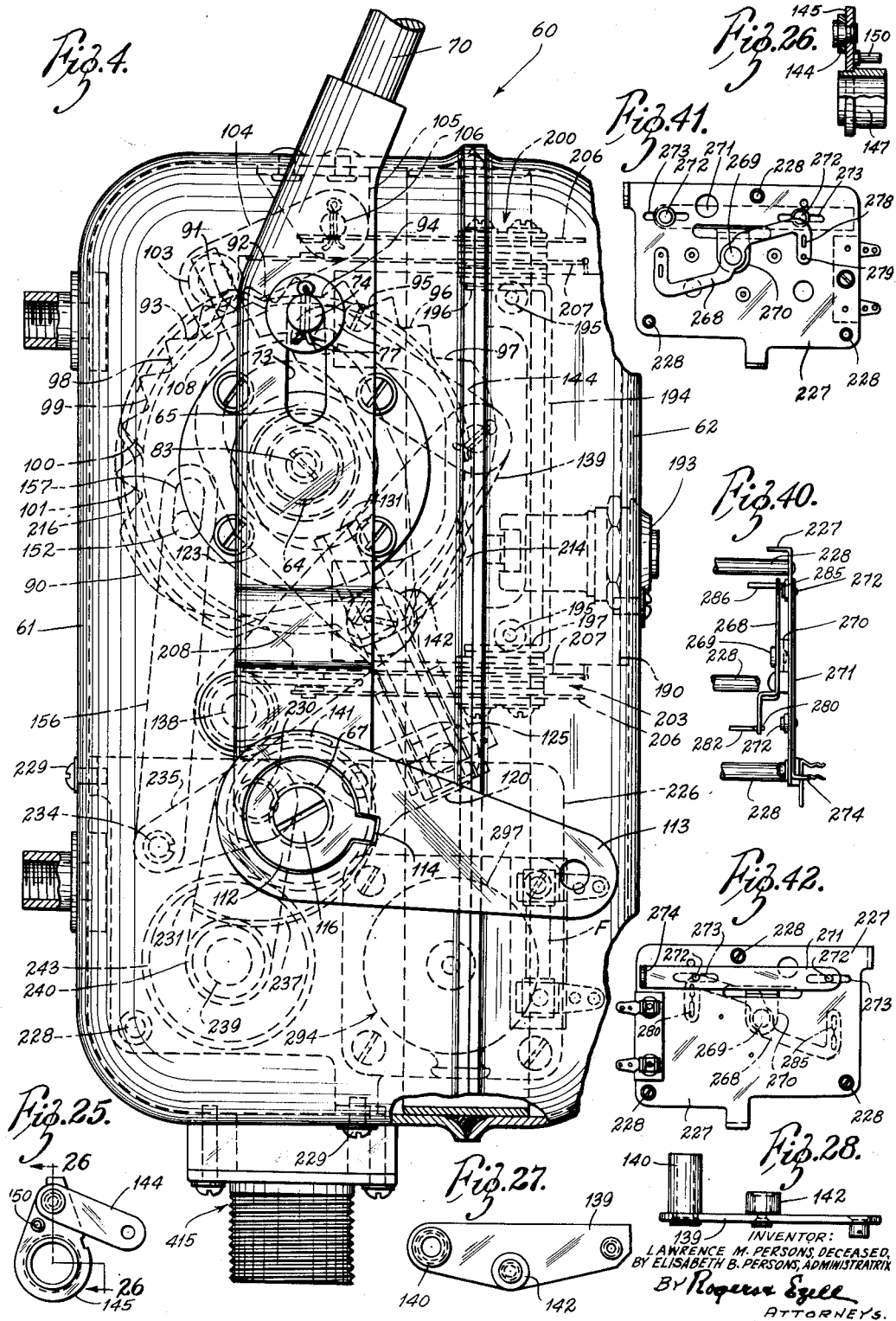
INVENTOR:
LAWRENCE M. PERSONS, DECEASED,
BY ELISABETH B. PERSONS, ADMINISTRATRIX
By Rogers Ezell
ATTORNEYS.

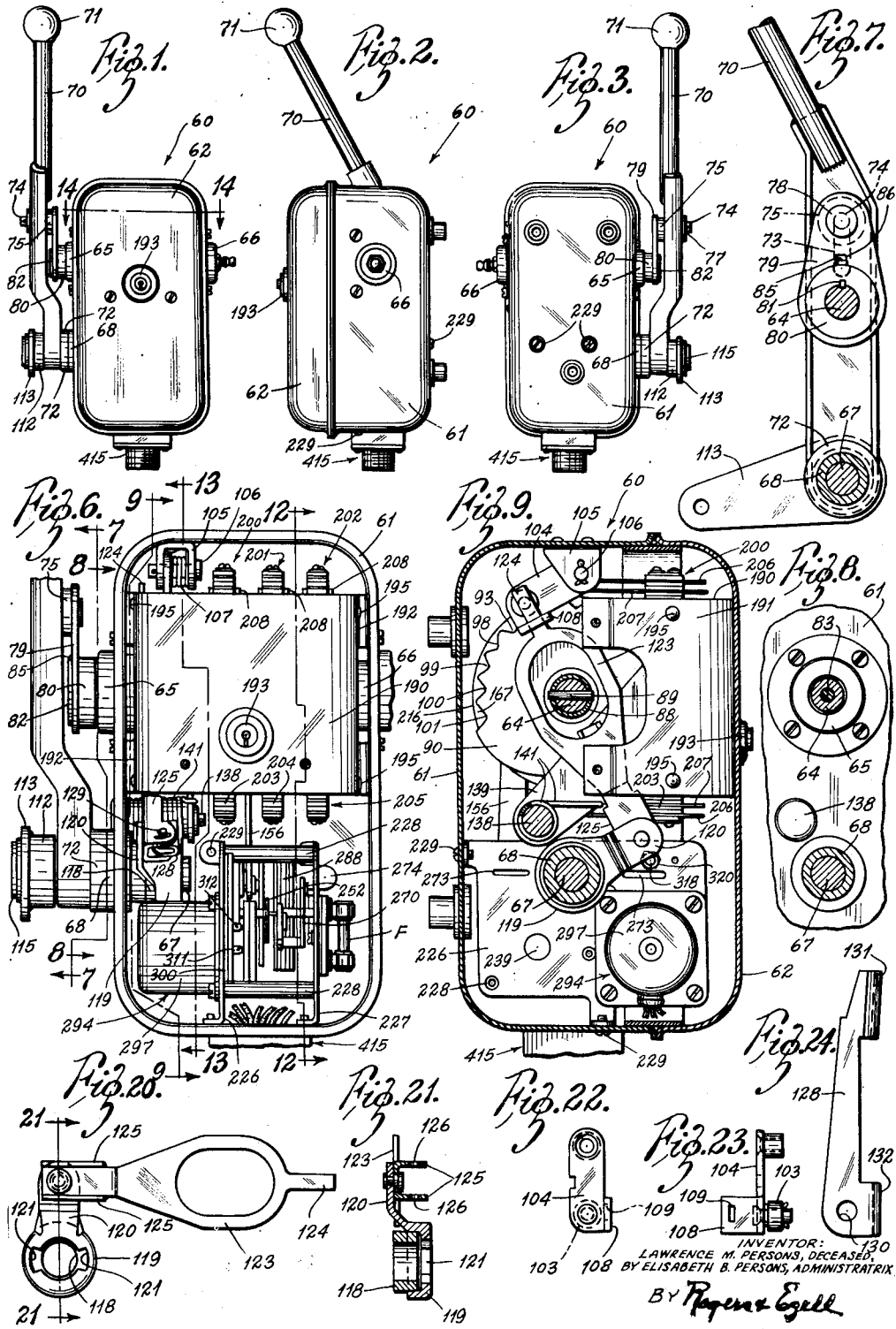

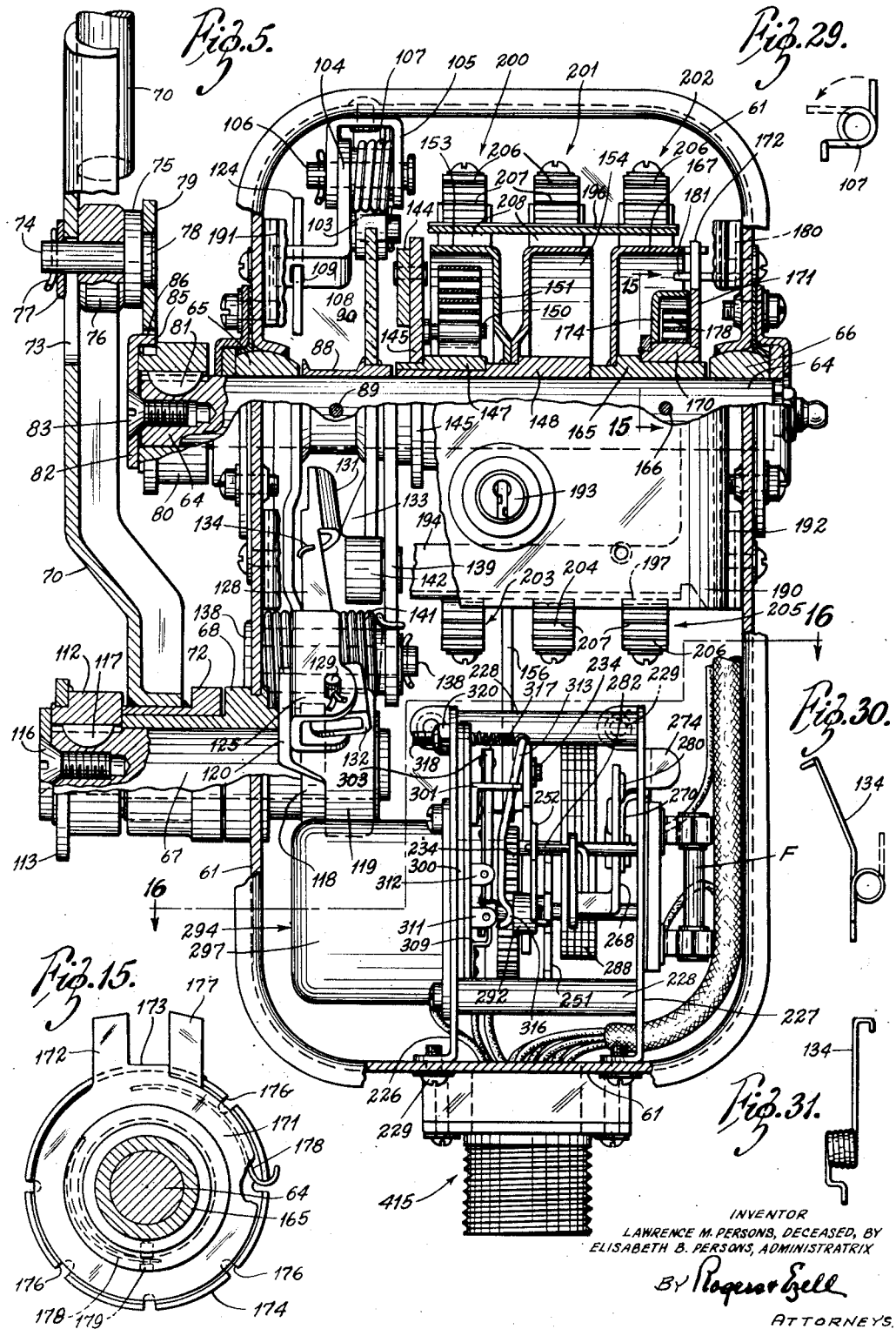

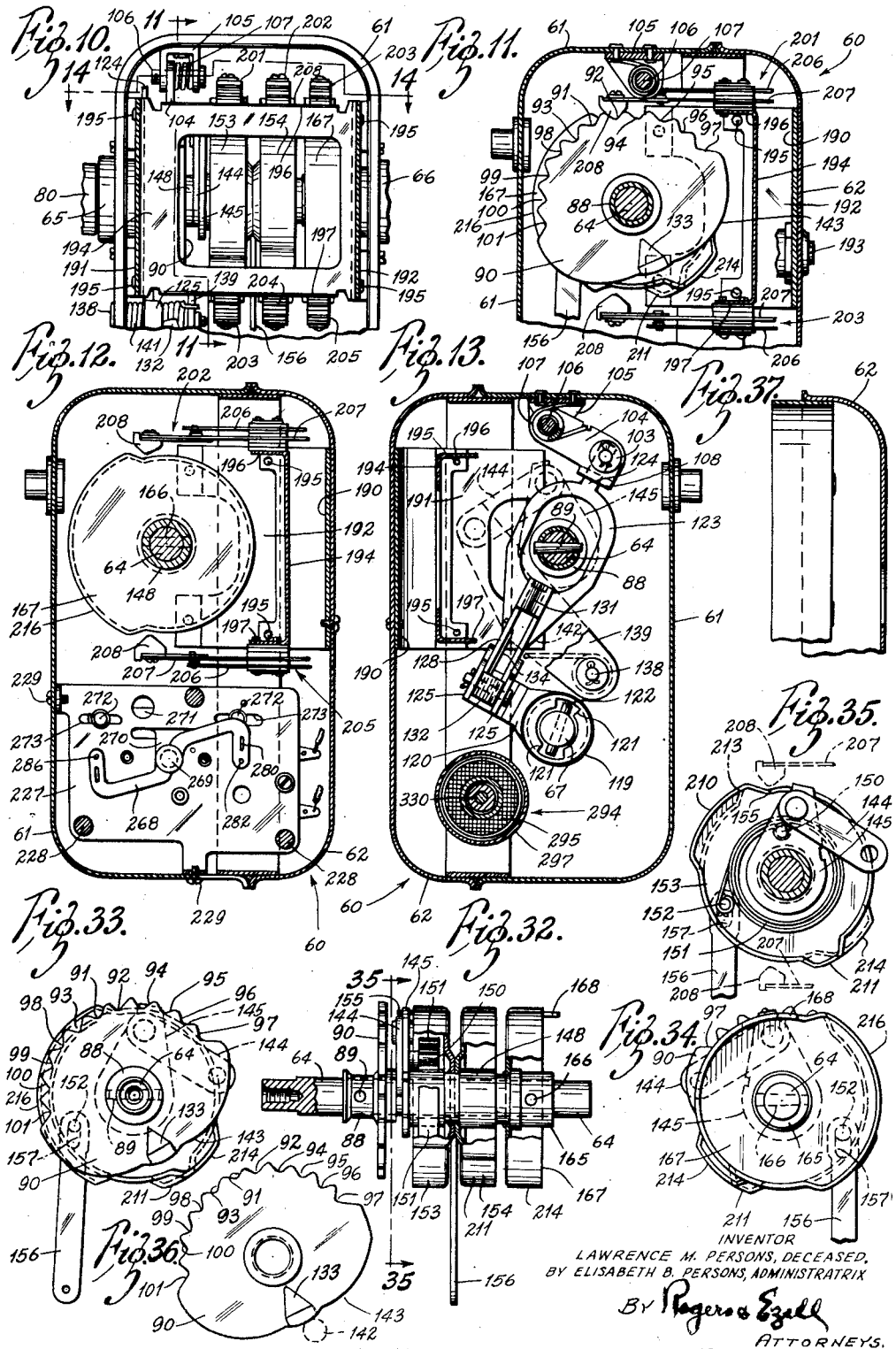

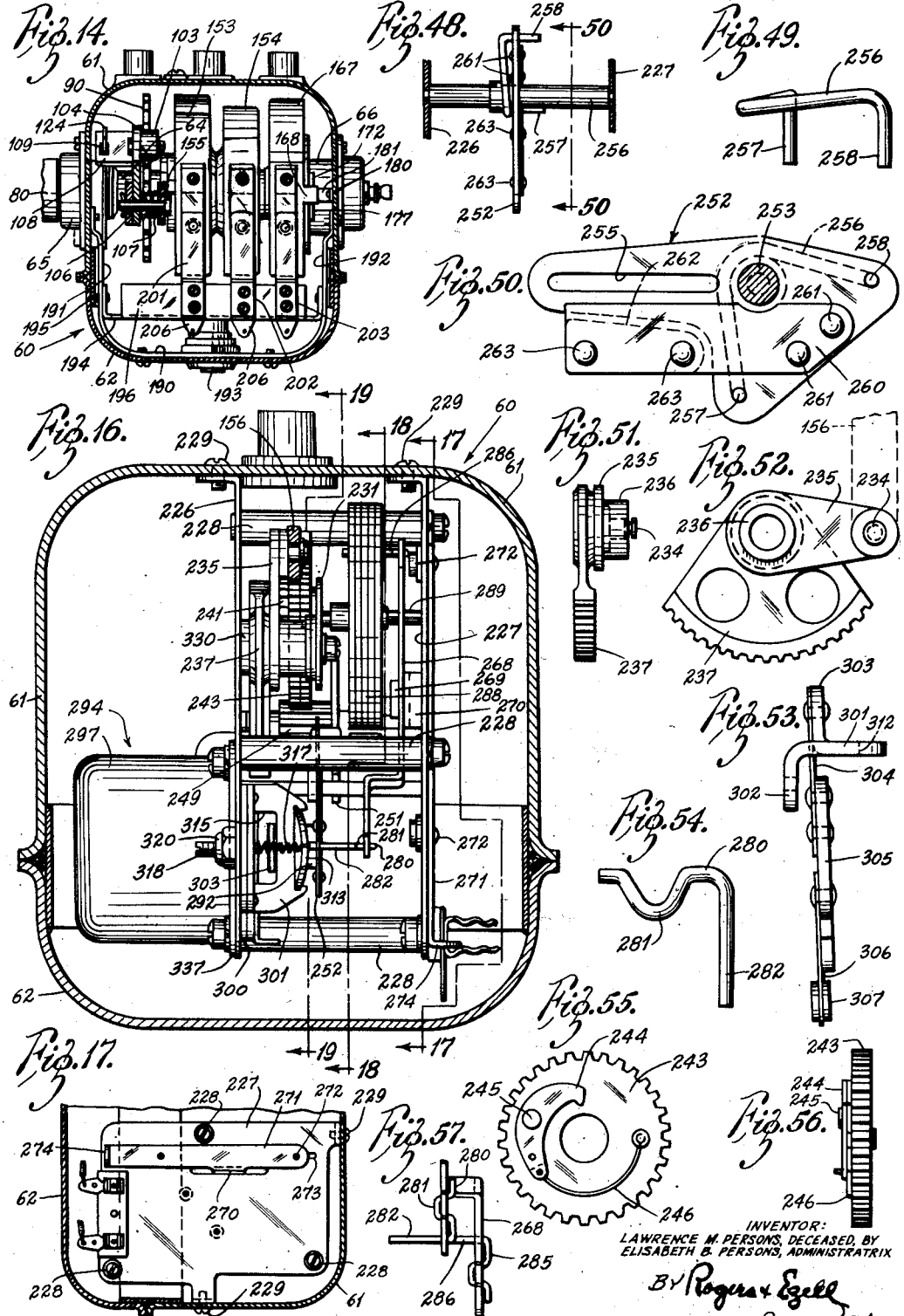

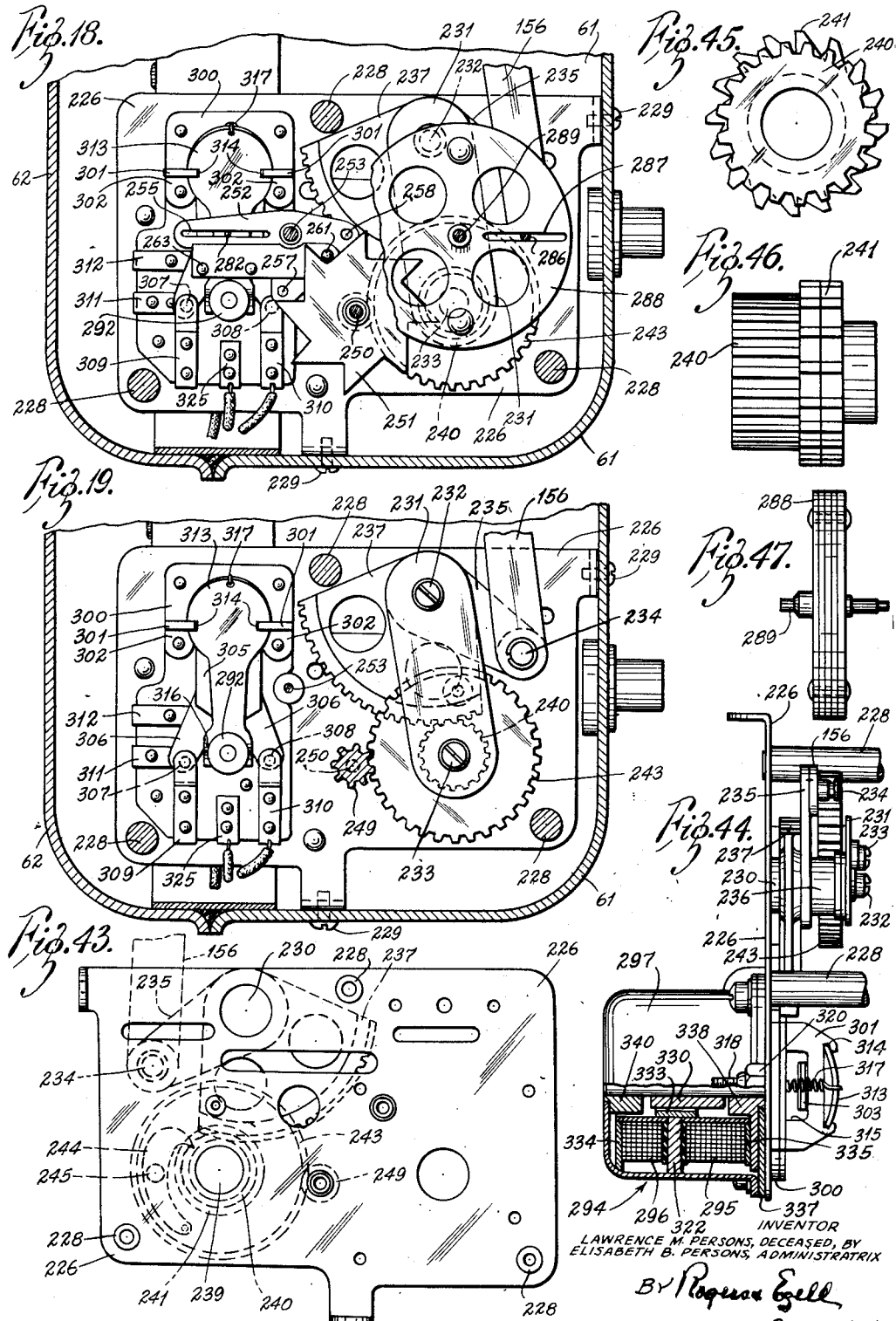

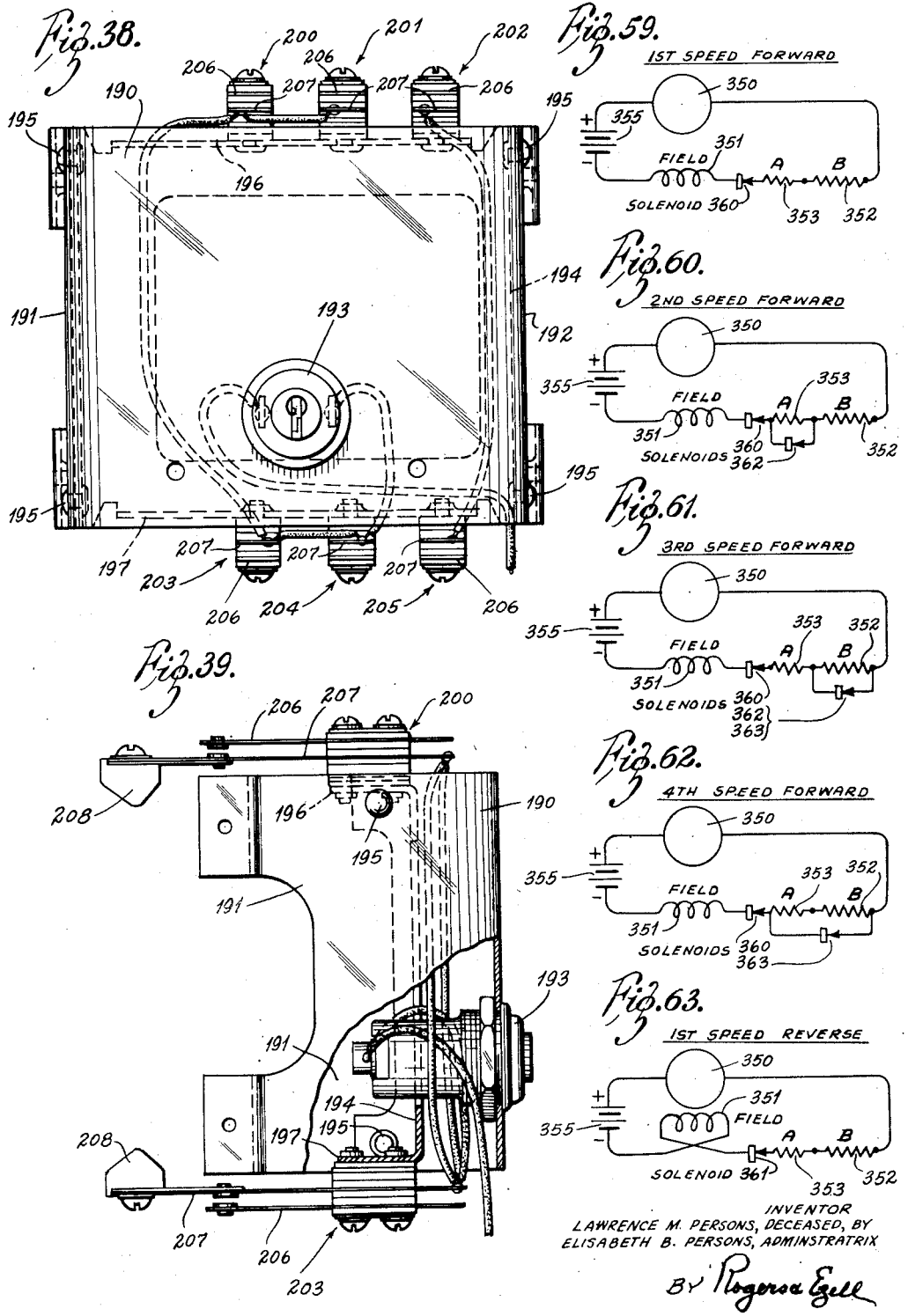

Nov. 17, 1953     L. M. PERSONS     2,659,851
REVERSING AND SPEED CONTROL FOR TRUCK MOTORS
Filed July 30, 1948     8 Sheets-Sheet 8

INVENTOR
LAWRENCE M. PERSONS, DECEASED.
BY ELISABETH B. PERSONS, ADMINISTRATRIX

BY Rogers & Ezell
ATTORNEYS.

Patented Nov. 17, 1953

2,659,851

UNITED STATES PATENT OFFICE 2,659,851

REVERSING AND SPEED CONTROL FOR TRUCK MOTORS

Lawrence M. Persons, deceased, late of St. Louis County, Mo., by Elisabeth B. Persons, administratrix, St. Louis County, Mo., assignor to McQuay-Norris Manufacturing Company, St. Louis, Mo., a corporation of Delaware Application July 30, 1948, Serial No. 41,695

24 Claims. (Cl. 318—262)

The present invention relates to a multi-speed truck control. More particularly, it relates to a control for use with electrically controlled or electrically driven motors, by which the operator may obtain a plurality of speeds, either forward or reverse. There are here illustrated four different speeds, forward and reverse, as well as a neutral position wherein no drive is provided.

It is an object of the invention to provide such a control for a truck or the like, or for a motor, that, by the operation of a single actuator into any of a plurality of positions, can obtain a plurality of speeds of the motive means, either forward or reverse, which is relatively simple and more compact than those heretofore obtained.

A further object is to provide a control of this type that will prevent excessively rapid shifts of the speed control and excessive currents through the motor and interposed switch devices, that might injure the motive means, shorten its life, and cause excessive wear upon the circuit breakers. Especially is it an object to attain the foregoing where the control is operated to reverse the direction of the motive means. It is a particular object to accomplish the foregoing by the interposition of a timing means into the control that will prevent unduly rapid shifts, and will reduce high current through the motor and switches as a result of speed changes. Another object is to attain the foregoing, in regard to a shift of direction of the motive means, by a hold-out control that is operated when the control is reversed by employing the electric motor motive means as a generator as a result of overtravel of the vehicle, until the motor has at least substantially reached a condition where it reverses its own direction of travel. Another object is to provide rapid shifting of direction between low speeds, to enable the truck to be worked into tight places.

Further objects include the provision of means to adjust the speed of the timing mechanism that controls the speed of the shifts; the provision of a dependable timing arrangement not subject to variation from conditions such as temperature changes; the provision of a particularly compact arrangement of cam switches to control the various speed responses; the provision of a foot actuatable control in addition to a normally manually actuatable control element; the arrangement of the foot control to afford rapid stopping of the motor, and for rapid acceleration only when another control has been operated to select direction; and the interconnection of the actuating means with the cams and the timing mechanism to permit the actuating member to move in advance of the cams, set the timing mechanism in operation, so that the latter ultimately permits the cams to follow up to the positions chosen by the actuating member.

Other objects will appear from the details of the description to follow and from the drawings. In the latter:

Fig. 1 (Sheet 1) is a front elevation of the control;

Fig. 2 is a side elevation thereof, taken from the right side of Fig. 1;

Fig. 3 is a rear elevation of the control;

Fig. 4 (Sheet 2) is a left side elevation of the control partly in section;

Fig. 5 (Sheet 3) is a front view of the control with the front cover removed and with parts shown in section;

Fig. 6 (Sheet 1) is a front elevation with the front cover removed;

Fig. 7 is a section on the line 7—7 of Fig. 6, showing the operating levers;

Fig. 8 is a section on the line 8—8 of Fig. 6;

Fig. 9 is a vertical section on the line 9—9 of Fig. 6, showing particularly the operation of the foot operated detent release;

Fig. 10 (Sheet 4) is a view of the upper part of the control appearing in Fig. 6, but with a bracket shown in section;

Fig. 11 is a front-to-rear section on the line 11—11 of Fig. 10;

Fig. 12 is a vertical front-to-rear section taken on the line 12—12 of Fig. 6;

Fig. 13 is a vertical front-to-rear section taken on the line 13—13 of Fig. 6;

Fig. 14 (Sheet 5) is a horizontal section taken on the line 14—14 of Fig. 1;

Fig. 15 (Sheet 3) is a vertical section, taken on the line 15—15 toward the right-hand end of the upper shaft in Fig. 5, showing handle return mechanism;

Fig. 16 (Sheet 5) is a horizontal section on the line 16—16 extending brokenly across the lower end of Fig. 5, giving a plan view of the timing mechanism and solenoid;

Fig. 17 is a vertical section taken on the line 17—17 at the right of Fig. 16;

Fig. 18 (Sheet 6) is a section through the timing mechanism on the line 18—18 of Fig. 16;

Fig. 19 is a section on the line 19—19 of Fig. 16;

Fig. 20 (Sheet 1) is a view of the foot operated detent release mechanism, taken from the right side of the control, turned somewhat from normal position;

Fig. 21 is a section on the line 21—21 of Fig. 20;

Fig. 22 is a view of the detent rocker arm, taken from the left;

Fig. 23 is a view of the detent arm, taken from the right of Fig. 22;

Fig. 24 is a side elevation of the foot latch arm;

Fig. 25 (Sheet 2) is a left side elevation of linkage for the speed cam operation;

Fig. 26 is a section on the line 26—26 of Fig. 25;

Fig. 27 is a left side elevation of a cam roller arm assembly employed in the linkage for operating the speed cams;

Fig. 28 is a bottom plan view of the arm of Fig. 27;

Fig. 29 (Sheet 3) is a side elevation of the detent torsion spring;

Fig. 30 is a front elevation of the foot latching arm torsion spring;

Fig. 31 is a side elevation thereof;

Fig. 32 (Sheet 4) is a side elevation partly in section of the index plate and cams mounted on the upper shaft;

Fig. 33 is an end view of the cam structure and the indexing plate, taken from the left of Fig. 32 and from the left side of the casing;

Fig. 34 is a view of the cam assembly taken from the right side of the casing and the right side of Fig. 32;

Fig. 35 is a section on the line 35—35 of Fig. 32;

Fig. 36 is an end view of the indexing cam plate;

Fig. 37 is a fragmentary view of the front casing section, showing how it is flanged to interfit with the rear casing section;

Fig. 38 (Sheet 7) is a front elevation of the cam switch subassembly and lock;

Fig. 39 is a side elevation of the subassembly of Fig. 38, taken from the left thereof;

Fig. 40 (Sheet 2) is a plan view of the right side of the timing mechanism assembly, showing the balance lever and adjustment therefor;

Fig. 41 is a left side elevation of the mechanism appearing in Fig. 40;

Fig. 42 is a right side elevation of the assembly appearing in Fig. 40;

Fig. 43 (Sheet 6) is a view of the left side of the timing mechanism;

Fig. 44 is a plan view partly in section of the left part of the timing mechanism and the solenoid;

Fig. 45 is a view of the ratchet wheel and gear assembly used in the timing mechanism;

Fig. 46 is a side elevation of the ratchet wheel;

Fig. 47 is an edge view of the balance wheel;

Fig. 48 (Sheet 5) is a plan view of the escapement lever and shaft;

Fig. 49 is a perspective view of the pin device for the escapement lever;

Fig. 50 is a front elevation of the escapement lever, taken on the line 50—50 of Fig. 48;

Fig. 51 is an edge view of the timing mechanism winding sector and arm;

Fig. 52 is a right side elevational view thereof;

Fig. 53 is a side elevation of the solenoid switch lever;

Fig. 54 is an elevation of the wire pin means for the balance wheel lever;

Fig. 55 is a face view of the ratchet gear;

Fig. 56 is an edge view of the ratchet gear of Fig. 55;

Fig. 57 is an end view of the balance wheel lever assembly;

Figs. 59 through 63 are schematic views of various combinations of operation of the truck obtainable with the present control.

Figure 58:
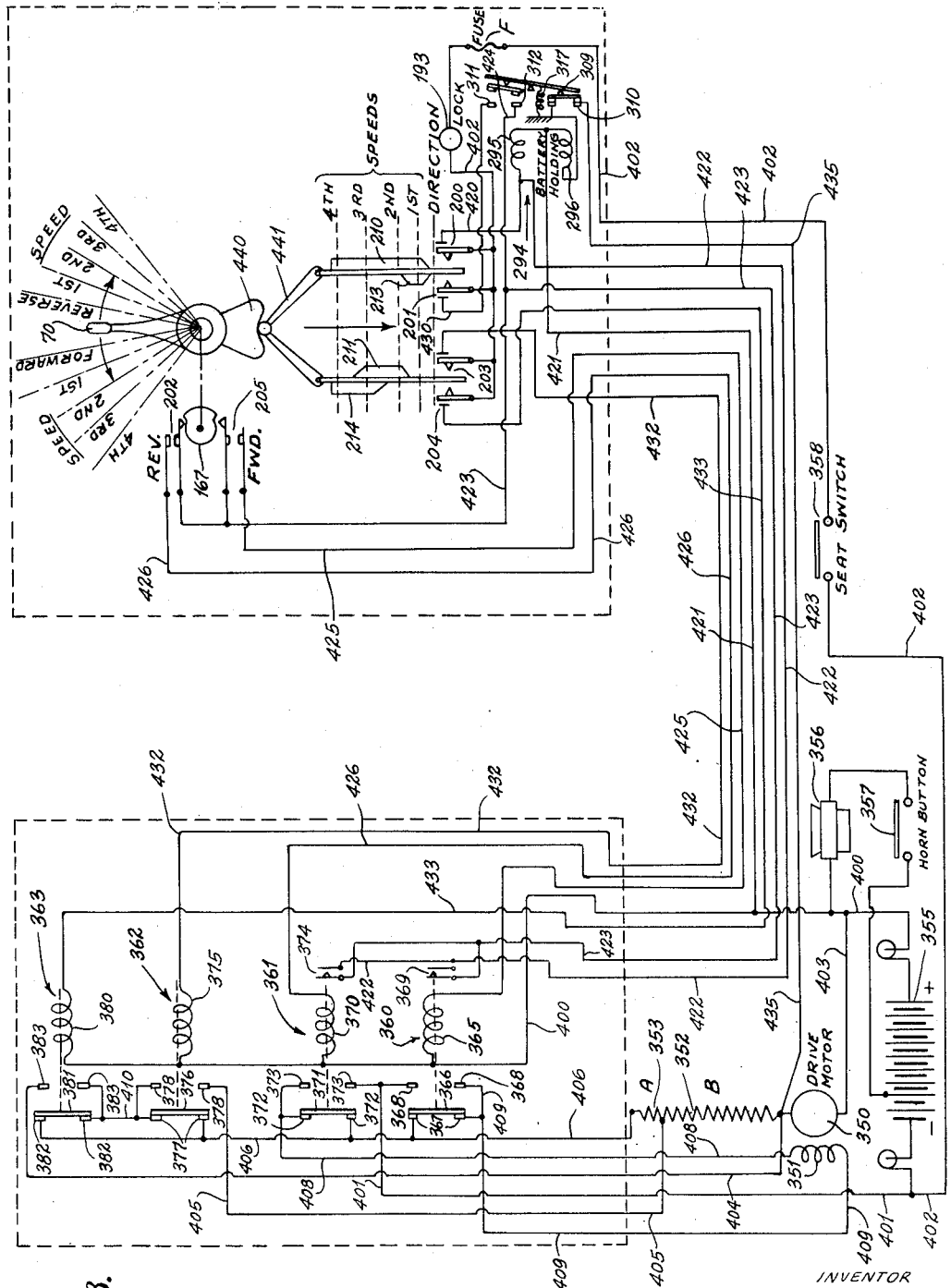
Fig. 58 (Sheet 8) is a schematic wiring diagram of the truck and the control.

The control itself is here illustrated as being enclosed within a strong casing 60 that preferably has a rear section 61 and a removable front cover 62. There are two main shafts in the rear section 61 of the casing. The upper shaft, indicated at 64, extends from side to side of the casing through the side walls thereof and has suitable bearings 65 and 66 in those walls. The lower shaft 67 is mounted in one side wall of the back casing element 61. The casing is provided with a bushing 68 that is secured to the side wall and affords an elongated sleeve that can give a cantilever-like support to the shaft 67.

An elongated actuator 70 is connected with both of the shafts 64 and 67. The actuator 70 has a handle knob 71 at its outer end, and at its lower end is given a channel shape, and is welded or otherwise secured at its bottom to a bushing 72 that rocks freely on the outside of a shouldered portion of the bushing 68 that supports the shaft 67.

Adjacent the shaft 64, the handle 70 has a slot 73 that extends through the web of the channel-like portion of the handle at this location. A pivot pin 74 passes through this slot. This pin has a flange 75 on it that engages a roller 76 so that the pin 74 may slide freely in the channel within the limits of the slot 73. A suitable removable pin and washer 77 holds the pivot pin 74 in place. The other end of the pin 74 has a head 78 on it that is suitably attached in a rivet-like manner to a crank lever 79. This lever 79 at its lower end is attached in similar rivet-like manner to a collar 80 that is mounted on a somewhat reduced outer end of the shaft 64 and is held in non-rotatable engagement therewith by a woodruff key 81. The rivet attachments just described may be enforced by other means such as solder. The assembly of the lever 79 is secured to the shaft by means such as an end thrust plate 82 that is held by a screw 83 to the end of the shaft 64, and which has a finger 85 that engages within a notch 86 provided in the lever 79.

From the foregoing, it may be seen that, when the handle 71 is moved, the actuator arm 70 will rock about the center of the lower shaft 67. This will displace the pin 74 and will cause the crank lever 79 to rock the shaft 64. This movement of the pin 74 involves sliding of the pin 74 in the slot 73. As will appear, the movement of the shaft is limited to approximately 90° from neutral position in each direction, which is sufficient to enable the operator to select any one of the speeds provided by the apparatus.

The shaft 64 rocks an indexing cam. As shown in Figs. 5, 9, 13 and 32, particularly, there is a hub 88 attached to the shaft 64 by a pin 89. From this hub, there extends out the indexing cam plate 90. This cam plate has a plurality of notches in its edge, the middle of which is one to establish a neutral position and the others of which are adapted to register with various operating conditions. For example, the middle notch 91 is the neutral notch, the notch 92 immediately to one side of the middle notch 91 establishes forward direction; the other notch 93 flanking the notch 91 establishes reverse direction. The notches 94, 95, 96 and 97 establish different forward speeds, and the other notches 98, 99, 100 and 101 establish different reverse speeds.

There is an index roller 103 that acts with the various index notches as a detent means. This index roller 103 is supported at the end of an index arm 104 (detail, Figs. 22, 23). The index arm, in turn, is pivoted in a bracket 105 attached to the top of the casing member 61. The bracket 105 has a pin 106 through its depending ears, which pin passes through a suitable opening in the upper end of the index arm 104. A torsion spring 107 surrounds the rocker pin 106 and has its ends suitably connected to apply tension to urge the arm 104 in a direction to yieldably engage the roller 103 in one or the other of the index plate notches.

The index arm has a ledge 108 that is at right angles from one of the two side edges of the arm adjacent its lower end. This ledge 108 has a hole 109 through it for a purpose to appear.

There is a foot control latch connected between the lower shaft 67 and the arm 103. Figs. 20 and 21 show the operating parts of this arrangement in detail; and the foot control members are shown in other views, as will appear.

The shaft 67 projects outwardly of the casing 61 beyond the lower end of the actuating arm 70 and is reduced somewhat in diameter. This outer portion of the shaft 67 receives the hub 112 of a foot control lever 113. The lever 113 extends out in a fashion so that it can be attached to a pedal at some suitable point on the truck. Fig. 4 shows that there is a notch and lug arrangement 114 between the hub 112 and the lever 113 to assure that these parts rotate together. They also may be otherwise attached. They are held to the shaft 67 by an end plate 115 and screw 116, or other like attachments. A woodruff key 117 causes the foot control lever 113 to rotate with the shaft 67.

Inside the casing, the shaft 67 projects beyond the bushing 68. This projecting end receives a bushing portion 118 that is securely attached to a hub portion 119 of an arm 120. The hub 119 has opposed arcuate notches 121 that receive the ends of a pin 122 (compare Fig. 13) that is secured through the shaft 67. Consequently, as the shaft rotates, the pin will have some lost motion but then will engage either the clockwise or counterclockwise ends of the notches 121 to cause rocking of the arm 120.

The arm 120 pivotally receives the lower end of a looped latch member 123. The loop in this latch member enables it to pass around the upper shaft 64 as is indicated in Fig. 9. Beyond the loop, the member 122 has a projecting pin-like portion 124 that passes through the hole 109 in the ledge 108 of the indexing arm 104. Reference to Fig. 9 will show that, if the arm 120 be rocked counterclockwise in that view, the pin 124 will slide within the opening 109 of the arm 104 until the rounded part of the member 123 engages the ledge 108 and causes the arm 104 to be rocked in a direction to disengage the roller 103 from the notches of the index plate 90.

It will be seen by reference to Figs. 20 and 21, and also Fig. 5 and other views, that the member 123 adjacent its pivotal connection to the arm 120 has flanges 125 that form its lower end into a channel-shaped element. There are holes 126 through these flanges 125. These flanges are adapted to provide pivotal support for a foot lever latch element 128 shown in detail in Fig. 24. A pin 129 passes through the holes 126 and a suitable hole 130 in the foot lever latch 128 to provide this pivotal support.

The latch 128 is made from a generally U-shaped cross section by forming sheet metal. It thus has side flanges joined by an upper connecting member 131 and a lower connecting member 132. The upper connecting member 131 preferably affords a sloping cross section for a purpose to appear.

The indexing plate 90 adjacent its lower end has a stamped-out portion 133 that is positioned to cross the path of the sloping connecting portion 131 of the latch member 128. These two parts are shown in engaged position in Fig. 5.

Of course, if the index plate 90 is rotated about the shaft axis 64, the displacement cam portion 133 will be withdrawn from the latch 128. This latch 128 is engaged by a torsion spring 134 that urges its upper end away from the nearby side of the casing, which is to the right in Fig. 5.

Slightly above and to one side of the lower shaft 67, the casing supports a stud shaft 138. On this shaft, a cam rocker arm 139 is mounted. This cam rocker arm appears in detail in Figs. 27 and 28, and appears in other views in assembly. As shown in Fig. 28, it has an elongated hub 140 at its lower end, this hub being mounted on the pin 138 as appears in Fig. 5. A coil torsion spring 141 surrounds this hub and is suitably attached at its ends to apply a force that rotates or tends to rock the upper end of the arm 139 toward the axis of the shaft 64.

The cam lever 139 has a cam roller 142 between its ends. This cam roller is positioned to engage the lower edge 143 of the indexing cam 90. The shape of this edge 143 is shown in Fig. 36. The relative position of the roller 142 when the cam 90 is in neutral position is indicated by dotted lines. There is a portion of the edge 143 of uniform radius adjacent the neutral point, followed by additional convex portions of increasing radial distance from the axis of the plate 90.

The upper end of the arm 139 is pivotally connected to a link 144 that is pivoted, in turn, to a crank arm 145. These parts are shown in detail in Fig. 25. As shown particularly in Fig. 26, the arm 145 is mounted upon a hub 147. This hub is shown in Fig. 5 and is rotatably mounted upon a bushing member 148 that, in turn, is mounted upon the shaft 64.

The arm 145 has a backwardly projecting pin 150, over which the inner end of a flat coil spring 151 is looped. As will appear, this coil spring transmits torsion to the cams that operate switches of this control. The other end of this coil spring is attached to a pin 152 that is mounted on and extends through the radial wall of a cam drum 153. The end view of the cam drum 153 appears in Fig. 35 in full lines. This cam drum 153 is attached in back-to-back relationship with another cam drum 154 against a shoulder on the bushing 148 by a permanent connection. The cam 153 has an axial projection 155 on its periphery that engages the upper end of the crank arm 145 under influence of the coil spring 151.

From the foregoing, it will be understood that, when the cam lever 139 is operated to draw upon the link 144 and rock the crank 145, this crank, through the medium of the pin 150 will tighten the spring 151 and may rotate both of the cam drums 153 and 154, the force being transmitted through the pin 152 mounted upon the cam drum 153.

An elongated link 156, having a slot 157 at its upper end, is likewise mounted upon the pin 152 and depends therefrom to a timing mechanism for a purpose that will appear later.

Beyond the hub 148 that supports the two cam drums 153 and 154, there is an additional hub 165 that is pinned at 166 to the shaft 64. This hub supports an additional forward and reverse cam drum 167. The periphery of the cam drum 167 has a finger 168 projecting therefrom parallel to the axis. The finger 168 is adapted to actuate a handle return spring mechanism shown in Fig. 15 in end elevation, and shown in section in Fig. 5.

The handle return spring mechanism includes a hub 170 rotatably mounted upon the hub 165.

A ring 171 is permanently attached to the hub 170. This ring has an upstanding finger 172 projecting generally radially outwardly and adjacent this it has a ledge-like flat portion 173. It interfits against a cup 174 that is rotatable on the outer surface of the hub 170 and is held thereon by means such as those indicated in Fig. 5. The cup has a finger 177 that is similar to the finger 172 of the plate 171, as is indicated in Fig. 15. A torsion coil spring 178 has one end attached around a locking pin 179 that is attached firmly to the hub 170. As is indicated, there are a plurality of notches 176 arranged around the periphery of the cup 174 to receive the hooked outer end of the torsion spring 178 so that it may be made tighter or looser as desired. The effect of the spring 178 is to draw the fingers 172 and 177 together until they are held in the spaced relation indicated in Fig. 15, by the portion 173 upon the plate 171.

A bracket 180 is attached to the housing by any suitable means, and it has a fixed ledge 181 that projects between the two fingers 172 and 177.

From the foregoing, it will be seen that rocking of the shaft 64 rocks the forward and reverse cam drum 167. The finger 168 on this drum fits between the two fingers 172 and 177 on the spring return. If the cam 167 is rotated in a counterclockwise direction looking from the left of Fig. 5 and from the front of Fig. 15, the finger 168 will displace the finger 172 but the other finger 177 will be held by the bracket ledge 181. Such displacement of the finger 172 will separate the fingers 172 and 177, tightening the torsion spring 178, so that a return force is applied. It will be evident that operation of the shaft in the opposite direction produces a similar displacement of the finger 177 with attendant tightening of the spring. This mechanism thereby applies a return force to the shaft 64 whenever it is displaced from its neutral position. This force is not enough to overcome that of the detent means on the indexing plate 90.

The cams actuate a plurality of switches. These switches form a part of a subassembly that is removably applied to the casing so that the switches may be actuated by the several cams. This assembly includes a fairly large plate 190 that is U-shaped in cross section, so as to provide opposite side portions 191 and 192. These side portions fit within the side walls of the back casing member 61 so that the front panel extends across the opening of the back section 61. The two side parts are then held to the side parts of the casing 61 by screws as illustrated in Fig. 14. A lock 193 is mounted on the bracket 190 and is interconnected with the electrical mechanism. A suitable opening extends through the front casing 62 for reception of the lock hole to render the same accessible from outside the mechanism.

Back of the front plate of the bracket 190, there is a supporting plate 194 that is flanged on all four of its sides. Its side flanges lie just inside the side walls 191 and 192 of the bracket 190 and are riveted thereto as at 195. It has an upper flange 196 and a lower flange 197 that support switch blade assemblies, all of which are alike in construction. There are three upper switch blade assemblies 200, 201 and 202, and three lower switch blade assemblies 203, 204 and 205. As shown particularly in Fig. 39, each switch blade assembly provides two spring blades 206 and 207 that have contacts on them. These blades are normally open to part their contacts by their normal springing character. Each blade 207, which is the inner blade of each switch, has an insulative cam follower 208 on it. The two blades are of course maintained insulated from one another and are provided with the proper connections for the circuits to be described hereafter.

When the cam switch subassembly is put together in the manner aforesaid, it can be inserted into the back casing section 61 and thereto attached. When so positioned, it will dispose the cam followers adjacent the several cam drums 153, 154 and 167. The switches 200 and 203 are diametrically oppositely arranged with respect to the cam drum 153. This cam drum is shown in Fig. 35 as having a fairly extensive upper cam rise 210 and a less extensive lower cam rise 211. Fig. 35 shows the cam drum 153 in its neutral position. As will appear from the description of the operation, the two cams 153 and 154 always move in the same direction from neutral position regardless of the direction of movement of the handle 70 and the shaft 64. Consequently movement of the cam drum 153 clockwise in Fig. 35 will shortly close both of the two switches 200 and 203, but will release the switch 203 before it releases the switch 200, owing to the greater arcuate length of the cam rise 210 than the cam rise 211.

The cam drum 154 operates the switches 201 and 204. As shown in Fig. 35, this cam drum has a relatively short upper rise, indicated largely in dotted lines at 213, and a longer lower rise 214. Hence the clockwise rotation of the cam drum 154 will close the switch 201 for a short period, and upon further rotation will close the switch 204.

The forward and reverse cam drum 167 is rocked in the same direction as the shaft 64, which shaft rotates in accordance with the direction of displacement of the handle 70 from neutral position. The position of the cam drum 167 in neutral is shown in Fig. 34, at which time both of the switches 202 and 205 are opened. The cam drum 167 has a single rise 216 that is displaced under one or the other of the two switches 202 and 205, depending on the direction of rocking of the cam drum 167. Thus one of these switches will be closed and the other left open whenever the shaft is rocked. This rise is effective before any of the rises on the cams 153 and 154 acts upon their switches.

As previously described, the rocking of the handle 70 in either direction will cause angular displacement of the crank arm 145, and this will similarly cause displacement of the pin 150 in a direction to wind up the torsion spring 151 that is connected to the drum 153 to rotate both it and the drum 154. During the early part of the movement of the pin 150 aforesaid, two drums 153 and 154 will follow the movement of the pin. However, the movement of the two cam drums 153 and 154 into their higher speed positions is regulated by a timing mechanism that controls the speed at which a change from one high speed position of the cam to another may be obtained, and especially that prevents the complete shifting of the direction of movement of the truck from forward to reverse, or vice versa, without giving the truck motor time to slow down.

The foregoing timing mechanism is controlled through the link 156 that is attached through a pin and slot arrangement to the cam drums 153 and 154. This link 156 extends downwardly as shown in the center of Fig. 5 into an escapement device.

Fig. 16 shows that the escapement mechanism is contained between two side plates 226 and 227 that are held in spaced relation by suitable spacer rods 228 or the like and with the assembly removably mounted onto the back and bottom of the back casing section 61 by suitable screws 229.

Mounted at one of its ends in the plate 226 is a fixed shaft 230. This shaft extends toward the other plate 227 a limited distance, and at its other end is mounted in one end of a strip-like plate 231. The plate 231 receives a screw 232 that attaches it into the shaft 230 that maintains its position away from the plate 226. At its lower end, it receives another screw 233 engaging a similar shaft device that extends back to the plate 226.

The link 156 that is attached by the slot connection to the cam drums 153 and 154 extends downwardly to the timing mechanism and is pivoted at 234 to a crank arm 235. This crank arm 235 is integrally attached about a hub 236 that also has attached to it a gear sector 237 (detail, Figs. 51, 52). The hub 236 extends away from the plate 226 and is supported upon the shaft 230 between the plates 226 and 231 for rocking thereon.

The gear sector 237 meshes with a gear 240 that is rotatably mounted upon the fixed spacer shaft 239 attached between the lower end of the plate 231 and the plate 226. This gear 240, as illustrated in Figs. 43, 45 and 46, has a ratchet wheel 241 secured to it. Also mounted upon the same shaft is a larger gear 243 (Figs. 55 and 56), which gear has a ratchet dog 244 pivoted thereon at 245 and spring-urged by a spring 246 to bring its actuating end toward the axis (details, Figs. 55, 56). As shown in Fig. 43, this arrangement will permit the link 156 to rock the sector 237 when the link is drawn upwardly, provided only that the gear 243 may be rotated. If the gear 243 cannot rotate, then the ratchet dog 244 on that gear will engage the ratchet wheel 241 and prevent rotation of the gear 240. As will appear hereafter, therefore, this puts a limit on the amount of free rotation that the drums 153 and 154 can have upon rotation of the handle. Operation of the handle beyond such limits of free rotation will merely further wind up the coil spring 151 and apply a strong upward pull on the link 156.

The gear 243 meshes with a small gear 249 that is on an escapement shaft 250. The escapement shaft 250 supports an escapement wheel 251 that rotates with the shaft. The shaft 250 is mounted between the two plates 226 and 227.

Cooperating with the escapement wheel 251, there is an escapement lever generally indicated at 252, it being mounted to rock upon a pin 253 that is supported between the plates 226 and 227. This escapement lever, as an assembly, is shown in Figs. 48, 49 and 50. It comprises a main plate member in the form of a lever, one arm of which has an elongated slot 255 in it. A wire member 256 is bent to the shape illustrated so that its central portion extends like a V over the hub of the lever and so that it presents two projecting pins 257 and 258 that pass through holes in the other arm of the escapement lever 252, which two pins constitute the escapement pins that cooperate with the escapement wheel 251, as is evident from Fig. 18. In addition, there is a stop element attached to the escapement lever. It includes a spring-like element 260 riveted to one portion of the escapement lever 252 and projecting therebeyond, so that its free end may yield away from the lever. However, it may not move in the other direction beyond the plane of the lever. This will be evident from Fig. 50 wherein the spring plate 260 is shown as superposed over one face of the lever. A rigid stop plate 262 is riveted at 263 to the free end of the spring plate 260 for a purpose to be described.

The slot 255 in the escapement lever is employed in connecting the escapement wheel to an inertia balance wheel. To this end, a balance wheel lever of somewhat zigzag shape is shown at 268 (Figs. 40, 41, 42 and 57). The balance wheel lever 268 is pivoted at 269 in balanced manner onto a bracket 270 that constitutes a projection of a slide bar 271. The slide bar is supported on the plate 227 for sliding movement fore and aft. To accomplish this, there are headed rivets 272 that pass through slots 273 in the plate 227. The slide bar has a bent-over end 274 by which it may be manually engaged to be moved toward the front or rear of the casing. By this means, the balance wheel lever may be bodily displaced at its pivot 269, forwardly or rearwardly of the casing.

The forward end of the balance wheel lever 268 is initially provided with a slot 278 and a hole 279. A wire spring member 280, as illustrated in Fig. 54, is provided with a reentrant bent portion 281 and a projecting pin portion 282. This member is inserted into the end of the balance wheel lever with the reentrant 281 engaged within the slot 278 and the pin 232 projecting through the hole 279. Thereafter, the portions of the balance wheel lever adjacent the slot are crimped together to hold this element in place. The pin 282, when the balance wheel lever is in its operative position, projects outward through the slot 255 in the escapement lever, and by it comprises connection. The rocking of the escapement lever is caused to rock the balance wheel lever.

The back end of the balance wheel lever receives a similar spring wire member 285 that has a projecting pin 286. This pin 286 engages in a slot 287 of a fly wheel 288. The fly wheel is mounted on a shaft 289 that extends from the plate 231 to the side plate 227.

When the gear 243 rotates, it rotates the gear 249 and the escapement wheel 251. The teeth on the escapement wheel are shaped and positioned in familiar manner to alternately engage the two pins 257 and 258 that project from the escapement lever 252 so that that lever is rocked about its pivot 253. Only by such rocking movement can the escapement wheel 251 rotate. As the escapement lever 252 oscillates, it rocks the pin 282 on the balance wheel lever and causes that lever to rock about its movable pivot 269. As the balance wheel lever 268 is also connected by a rocking pin 286 to the balance wheel 288, it causes that balance wheel 288, which is relatively massive, to rock back and forth with each oscillation cycle of the escapement lever 252.

A shifting back or forward of the slide bar 271 that supports the pivot 269 of the balance wheel lever 268 changes the leverage ratios of the foregoing escapement mechanism. If the slide bar and the two pins 282 and 286 are moved backwardly from their positions in Fig. 18, the leverage of the escapement wheel 251 upon the escapement lever 252 will increase, but the amount of angular movement of the balance wheel 268 will decrease. At the same time, the leverage of the balance wheel lever 268 on the balance wheel 288 will decrease. When the slide bar 271 is toward the back of the casing, the escapement will be most rapid. As the slide bar is moved forwardly, the escapement becomes slower.

As shown in Fig. 18, the escapement lever 252 is in a neutral or mid position. In that view, immediately below the stop plate 262 of the escapement lever 252, there is a circular blocker member 292. Reference to Fig. 5 will show that this blocker member may be so located as to be interposed beneath the stop plate 262. Comparing Fig. 18, the blocker 292 will therefore, under such circumstances, prevent the full oscillation of the escapement lever 252, and can block the rotation of the escapement wheel 251.

The previously mentioned blocker 292 is attached to the core of a solenoid, generally indicated at 294. This solenoid includes coil means 295 and 296 duly provided around a core and enclosed within a cup 297 that is attached to the outside of the plate 226. The plate has a hole for the end of the core to pass through it.

On the inside of the plate 226, there is mounted an insulative plate 300. On the inside of the plate 300, there is mounted a pivot bracket 301 (particularly Fig. 53). This bracket has two downwardly turned side legs 302, by which it is attached to the plate 300. The material from between these legs is stamped backwardly, as shown at 303, to support a first spring hinge member 304. This spring hinge member has an insulative plate 305 riveted to it, at the lower end of which is riveted another spring hinge plate 306 that is forked, as shown in Fig. 19, to support the contacts 307 and 308. The plate 300 supports two fixed contact brackets 309 and 310 that are adapted to be engaged, respectively, by the contacts 307 and 308 on the switch blade 306. The springing of the plates 304 and 306 is such as to engage the contacts in closed relationship normally. When the plate is moved in the opposite direction about its pivot hinge 304, its contacts 307 and 308 are engaged with two other fixed contacts 311 and 312, the latter crossing over and turning down under the switch blade.

As shown in Fig. 16 particularly, the upwardly projecting edge of the bracket 301 has a recess 315 cut therein. An actuating lever 313 has a rounded head that is notched at 314 so that it may be pivotally engaged within the recess 312. This lever is somewhat bent, as shown in Fig. 5, and has its lower end bifurcated and rounded off at 316 so as to be engaged under the blocker head 292 on the core of the solenoid. A coil spring 317 at the upper end of this lever 313 acts to urge the lower end 316 against the head 292. This coil spring is attached to an adjustment screw 318 that is threaded into the plate 226 and locked by a lock nut 320, as shown in Fig. 5. By this means, the tension of the spring 317 may be varied. By this means, an adjustment can be made to vary the speed in which motor will reverse direction. As will appear, the return of the handle 70 to neutral position causes the shaft 64 to return, and the return spring returns the cam 167 at a speed fixed by the torsional force of the spring 178.

Adjacent its lower end, the lever 313 may engage the insulative plate 305 of the switch blade so as to displace the contacts 307 and 308 from their respective fixed contacts and thus shift the solenoid switch. In addition, when the coil means are properly energized, the blocker 292 will withdraw from the path of the escapement lever 252 and permit the same to oscillate. If it returns during a period in the oscillation when the stop plate 262 is in its path, it will deflect the stop plate by deforming the bronze plate 299.

The lower end of the plate 300 also supports a contact 325 that acts as a terminal.

As shown in Fig. 44, the solenoid plunger has an enlarged magnetic portion 330 attached thereto and closely spaced with respect to the two coils 294 and 295 so as to be attracted thereby.

The two coils 295 and 296 are wound around brass sleeves. The two are separated by a magnetic disc 332 flanked by suitable plastic insulator discs and surrounding and magnetically attached to a magnetically conducting sleeve 333. Similar steel plates 334 and 335 are provided at the ends of the coils. There are Bakelite or similar insulators at the outer ends of the coils. A disc 337 of magnetic material has a sleeve 338 of like material at its middle, this sleeve receiving the core and extending axially inwardly. A similar hollow cup 340 of magnetic material is attached to the inside of the cup 297. The core causes the collar 339 to reciprocate between the members 338 and 340.

The wiring of the arrangement is shown schematically in Fig. 58, with certain combinations illustrated in abbreviation in Figs. 59 through 63.

In Fig. 58, the cam actuated switches are shown as operated by a different type of cam because of clarity in diagrammatic illustration. This type of cam is not as desirable as the one illustrated in detail.

Referring particularly to Fig. 58, there is shown a drive motor 350 having a field winding 351 and a combination series resistor 352 and 353. A battery is shown at 355. As a matter of detail, a horn is shown at 356 with a horn button at 357, these being connected directly across the battery. There is also a seat switch 358 that constitutes a master control switch to prevent operation of the truck when the seat is not occupied.

In addition, there are four relays provided for the truck. These are shown at 360, 361, 362 and 363. The relay 360 has a coil 365 and a double-pole, double-throw armature 366 that is adapted to close either a set of contacts 367 when the coil is deenergized or a set of contacts 368 when the coil is energized. In addition, the core of the coil closes a holding switch 369 when the coil 365 is energized.

The relay 361 includes a coil 370 adapted to actuate an armature 371 that normally closes with a pair of contacts 377, but, when energized, is energized, closes a pair of contacts 373. This core also closes a holding switch 374 when the coil is energized. The relay 362 includes a coil 375 with an armature 376 that normally closes with a pair of contacts 377, but, when energized, closes a pair of contacts 378. The relay 363 include a coil 380 that has an armature 381 normally closing with a pair of contacts 382, and which closes with a pair of contacts 383 when it is energized.

The positive side of the battery has a lead 400 that is connected to one side of each of the relay coils 365, 370, 375 and 380. The negative side of the battery is connected by a lead 401 that leads to one contact each of the contact sets 368 and 373 of the relays 360 and 361, respectively. Another line 402 leads from the negative side of the battery over through a fuse F, and the lock 193, to one side of each of the four cam-operated switches 200, 201, 203 and 204.

The drive motor 350 is connected by one line 403 to the positive lead 400 from the battery. The other side of the motor armature is connected directly into one end of the series resistor 352 and 353. It is also connected by a line 404 into one contact 383 of the relay 363. The upper end of the resistor 352 is connected by a line 405 to one of the contacts 378 of the relay 362. The upper or outer end of the resistor 353 is connected by a line 406 that leads to one of the contacts 367 of the lower relay 360, to one of the contacts 372 of the relay 361, to one of the contacts 377 of the relay 362, and to one of the contacts 382 of the relay 363.

The series field winding 351 of the motor is connected to a line 408 that leads from one of the contacts 372 and one of the contacts 373 of the relay 361. The other end of the field winding 351 is connected by a line 409 to one of the contacts 367 and one of the contacts 368 of the relay 360.

The two adjacent contacts 377 and 382 of the relays 362 and 363 are connected by a line 410 that also connects together adjacent contacts 379 and 383 of the same two relays.

It will be understood that the parts in the right-hand section of Fig. 58 represent connections within the control box 61. The leads are brought out through the plug terminal 415 at the bottom of the back casing section 61.

The line 402 that runs from the negative side of the battery through the seat switch 358 extends through the fuse and through the lock 193, and thence to one side of each of the switches 200, 201, 203 and 204. The other side of the switch 200 leads by a line 420 to the main winding 295 of the solenoid 294. The other side of this coil leads by a line 421 into the line 400 on the positive side of the battery. In addition, the line 420 connects with a branch wire 422 that connects into one side of each of the switches 369 and 374. If one or the other of the coils 365 or 370 is energized, one of the two switches mentioned will be closed and the foregoing wire 422 will be connected with a wire 423. The wire 423 connects into the movable contacts of both of the forward and reverse switches 202 and 205. A branch 424 from the line 423 leads to one contact 312 of the solenoid switch.

The other contact of the forward directional switch 205 is connected by a wire 425 that leads into one end of the coil 365 of the first truck relay 360, the other end of which is connected with the positive side of the battery.

The fixed contact of the reversing switch 202 is connected by a wire 426 that leads into one side of the coil 370 of the second truck relay 361, and thence to the positive side of the battery. It will later appear that the relay 360 is a forward directional relay, and the relay 361 is a reverse directional relay.

The cam-actuated switch 201 has its fixed contact connected by a line 430 to the contact 311 of the switch actuated by energization of the solenoid 294.

The fixed contact of the cam-operated switch 203 is connected by a wire 432 that connects into the coil 375 of the relay 362. The cam-operated switch 204 has its fixed contacts connected by a wire 433 that leads to the coil 380 of the relay 363. A wire 435 connects one side of the motor 350 to the contact 310 of the solenoid 294, closed with the contact 309 when the core is out.

As illustrated in the wiring diagram of Fig. 58, the actuating arm 70 rotates a shaft that also rotates the cam 167 to actuate the forward and reverse switches. It is also illustrated schematically as having a double cam arrangement 440 projecting below the shaft that, when rotated in either direction from the neutral position shown, depresses a fork 441 that drives the two cam holding rods downwardly. An analysis will indicate that the operation of this is the equivalent of the operation of the cams illustrated in the detailed structural description, insofar as the wiring circuits are concerned.

*Operation*

When the actuating arm 70 is in the neutral position, the indexing cam 90 will have its cam roller 103 disposed in detaining fashion in the notch 91. The lower edge 143 of the indexing cam plate will have its middle arcuate portion against the cam roller 142 on the arm 139, so that the arm 139 is pivoted or rocked on its pin 138 to dispose its upper end as close to the center of the shaft 64 as it ever can get. This will cause the crank 146 that is attached to the bushing 147 to rotate to its maximum counter-clockwise position, viewed from the actuating handle side of the control box. The torsion spring 151 will draw the cam drum 153 clockwise a maximum distance until the finger 155 on the edge of the cam drum 153 engages against the upper end of the arm 145. This will stabilize both of the cam drums 153 and 154 in their neutral position, so that all of the switches 200, 201, 203 and 204 are opened.

At this time, as illustrated in Fig. 5, the outwardly struck portion 133 on the lower end of the indexing plate 90 is engaged under the connecting portion 131 on the foot operated latch lever, holding the shoulder formed by the inner end of this connecting portion 131 away from the roller 142 that is on the lever 139. As a result of this positioning of the latch lever 128, rocking of the foot crank 113 and attendant rotation of the lower shaft 67, and rocking of the cross pin 122 in the notches 121, cannot displace the link 139. Rather, the connecting portion 131 on the latch lever by the aforesaid action of the foot crank 113 will be drawn down over the face of the roller 142 without performing any work thereon.

The directional cam 167 will be in its neutral position, with the finger 169 disposed between the two arms 172 and 177 on the handle return device, and with the finger 168 also disposed directly above the bracket projection 181.

In the neutral position of the cams 153 and 154, the pin 152 will be disposed at the bottom of the slot 157 in the link 156 that connects into the timing mechanism. As a result, these parts will be in the position shown in Fig. 19 where the gear sector 237 is in position to operate a full stroke on the gear 240.

At the start, the solenoid 294 will have its coils deenergized and its core released, and the coil spring 317 rocking the lever 313 will cause the head 292 on the core of the solenoid to be out in the position indicated in Fig. 18 wherein it engages the stop plate 262 on the escapement lever 252 to prevent the timing mechanism or escapement device from functioning. Also, the solenoid switch contacts 309 and 310 will be closed, and the contacts 311 and 312 will be open.

Assuming that the connections are made as they appear in Fig. 58 and that the seat switch 359 is closed by the fact that an operator is in the truck and occupying the seat, the line 409 from the positive side of the battery will be connected to one end of each of the truck relay coils. The negative side of the battery will be connected through the fuse and the lock 193. When the lock is operated by its key, it will close a switch so that the line 402 may continue to the movable contacts of all of the cam-operated switches 200, 201, 203 and 204.

To initiate operation of the control, the first step is to rock the actuating arm 70 one step forward or backward. Assuming that it is desired to move the truck forward, the handle will be moved one step forward. One step forward is attained when the pin 74 passing through the handle displaces the crank lever 79 keyed at 81 to the shaft 64 a sufficient arcuate distance to cause the indexing plate 90 to rock so that the notch 91 thereon is displaced from the roller 103 on the detent mechanism and the notch 92 is moved under the detent roller 103. At the same time, the pin 166 on the shaft 64 will displace the hub 165 and the directional cam 167 an equal angular distance. This will cause the finger 168 on the cam to move the projection 177 on the cup 174 and partially wind the spring 176 so that the same applies a return force to the shaft 64 that can return the shaft whenever the detent roller is withdrawn from the indexing plate 90. Also, such rotation of the cam 167 causes its rise 216 to close the bottom switch 205 in Fig. 5 and in Fig 58. As will appear from the wiring diagram in the discussion to follow, this pre-establishes the direction of the drive motor 350 for subsequent movements at various speeds.

Such slight rocking of the indexing plate 90 as is caused by moving it the distance of one notch in either direction from the neutral notch 91 does not displace the cam roller 142 on the link 139 of the speed responsive cam drive mechanism because the cam roller 142 in such movement remains on the arcuate portion of the edge 143, and hence is not displaced radially by the indexing cam 90. However, such rotation is sufficient to withdraw the rise 133 on the lower part of the indexing cam 90 from the connecting portion 131 on the latch lever 128, so that the spring 134 can move the connecting portion over the cam roller 142. This predisposes the parts for certain operations by the foot pedal that will be described separately hereafter.

If the operator then advances the handle another notch, so that the indexing cam 90 is moved to dispose its notch 94 under the detent wheel 103, an action of the speed control cams 153 and 154 will take place. All additional rocking of the shaft 64 will increase the displacement of the directional cam 167, but, owing to the fact that the rise 216 on this cam has a large arcuate extent, this will not change the fact that the switch 205 remains closed. It will, however, further tighten the handle return torsion spring 178.

Such further rocking of the indexing cam 90 will cause its lower edge 143, laterally of the arcuate portion thereof, to displace the roller 142 further away from the center of the cam. This will rock the link 139 upon which the roller 142 is mounted to drive its upper end toward the front of the control box, and, by the pivotal connection of the link 139 with the crank arm 145, will displace the pin 150 about the center of the shaft 64 a predetermined distance toward the front of the control casing, which is clockwise viewed from the handle end of the casing. This will apply a tightening to the coil spring 151 and will withdraw the upper end of the crank arm 145 from the finger 155 on the cam 153. The force of the spring 151 is sufficient to cause the cams 153 and 154 to follow until the finger 155 again engages the upper end of the crank 145. Such movement is sufficient to cause the rise 210 on the cam 153 and the rise 213 on the cam 154 to close the switches 200 and 201. This will be evident as being the first speed position indicated in Fig. 58.

In the foregoing displacement of the cams to their first speed position, the pin 152 rises from the bottom of the slot 157 in the arm 156 connecting into the timing mechanism to the top thereof without displacing the sectorial gear in the escapement device. This is a valuable feature in the present arrangement, as will appear hereafter.

Reference to Fig. 58 will show what happens when the switches 205, 201 and 200 are thus operated. There will be a circuit from the negative side of the battery through the line 402, the seat switch, the fuse and the lock to the movable contacts of the switches 200 and 201. Closure of the switch 200 will continue the circuit from the line 402 to the line 420. This circuit cannot continue through the branch line 422 because both of the switches 369 and 374 are open until their coils are energized. However, the circuit can continue through the coil 295, thence by way of the line 421 back to the line 400 and the positive side of the battery. This energization of the coil 295 will draw the core of the solenoid in, which is represented in the wiring diagram by a rocking lever that closes the contacts 311 and 312 with each other, and at the same time opens the contacts 309 and 310 from each other.

When the contacts 311 and 312 are thus closed, the second cam switch 201 becomes effective, because it continues from the line 402 to the line 430 that leads through the foregoing solenoid switch contact to the line 424 that connects with the line 423 leads to the forward switch 205, and thence by way of the line 425 to the coil 365 of the relay 360, and thence to the line 400 and the positive side of the battery. This energization of the coil 365 pulls its armature 366 up to break with the contacts 367 and to make with the contacts 368. It also closes the switch 369.

Fig. 59 shows in abbreviated form what happens in the motor circuit when this solenoid switch 360 is thus actuated. The motor is put in series with both sections 352 and 353 of the resistor so that it operates at a slow rate of speed, the current flow through the field winding 351 being in a direction to obtain forward rotation of the motor. In Fig. 59, this may be assumed to be a current flow from left to right in the field winding 351.

The actual detailed circuit corresponding to first speed forward can be based on Fig. 58 by taking the line 401 from the negative side of the battery. This will connect to the contacts 368 of the energized solenoid switch 360, thence by the line 409 from the bottom to the top of the field winding 351, thence by the line 403 to the switch 361, the contacts 372 of which are closed, and thence by way of the line 406 and through both resistors 353 and 352, through the motor 350 and the line 400 back to the positive side of the battery.

When the solenoid 360 closes the holding switch 369, a circuit is established in parallel with that established by the cam-actuated control switch 201, which circuit is dependent upon continued energization of the coil 365. Such circuit extends from the line 402 through the first cam-operated switch 200, the line 420, the branch line 422, the switch 369, the line 423, and thence, as before, through the forward switch 205, the line 425 and the coil 365. As long as the coil 365, therefore, remains energized, and the switch 200 remains closed, the solenoid relay switch may open its contacts 307 and 312 without breaking the drive of the truck.

If it is desired to obtain a second speed forward, the actuating arm 70 is moved to displace the indexing cam another notch to bring the notch 95 under the detent wheel 103. This action further displaces the roller 142 and the arm 139 to draw the crank arm 145 and the pin 150 a further distance from their starting point. This applies additional torsion on the spring 151, and tends to draw the cams 153 and 154 a further distance away from neutral. However, when this amount of action is produced for these two cams, the pin 152 is displaced in engagement with the upper end of the slot 157 of the connecting link 156 that leads to the timing or escapement device. The torsion spring 151 is then caused to apply an upward force to this arm 156. As shown in Figs. 18 and 19, this upward force tends to rock the sector gear 237 to drive the small gear 240. The small gear 240 acts through the ratchet dog 244 to apply force to the larger gear 243, which is in mesh with the small pinion 249 that has the escapement wheel 251 thereon.

At the start of the operating of the truck, it was stated that the solenoid 294 had its blocker element 292 in the path of movement of the stop element on the escapement lever 252. Previously described operations to first speed have caused energization of the solenoid and the withdrawal of the blocker 292 from the path of this escapement lever. Therefore, the rotative effect applied to the escapement wheel 251 can cause a rocking of the escapement lever 252 through the interengagement of the pins 257 and 258. The escapement lever, by means of the engagement of its slot 255 over the pin 282 on the balance wheel lever 268, causes the latter lever to rock. The balance wheel lever 268 has its pin 286 engaging in the slot 287 to oscillate the balance wheel 288. The speed at which the escapement can operate is a function of the adjustment of the adjustment bar 270 that displaces the pivot point of the balance wheel lever 268. Consequently, the permitted speed of rotation of the gear train, and ultimately the speed at which the arm 156 may rise is determined by the escapement mechanism which is driven from the torsion spring 151 within the cam 153.

As a result of the foregoing, the initial displacement of the crank arm 145 and the pin 150 of the spring 151, occasioned by displacement of the indexing wheel from its notch 94 to the notch 95 for second speed forward, will not be attended by an immediate and equal displacement of the cams 153 and 154. The cams will, rather, follow the displacement aforesaid of the indexing wheel, but only with an intervening time delay that is determined by the escapement mechanism. They will rotate under control of the escapement mechanism until the finger 155 on the cam 153 again engages the top of the lever 145 in the new position of the latter.

Reference to the wiring diagram of Fig. 58 will illustrate that in the second speed position the cam rise 210 holds the initial cam switch 200 closed. The cam rise 213 withdraws to permit reopening of the switch 201, and the cam rise 211 on the cam 154 will close the switch 203. In other words, in the second speed position, the switches 200 and 203 are closed, the other two cam switches being open. The switch 205 remains closed.

With the switch 200 continuing closed, its circuit to the solenoid coil 295 can continue; and also its circuit through the line 422, the holding switch 369, the line 423, and thence to the forward switch 205, and back by the line 425 to the coil 365, can remain energized, depending upon continued closure of the holding switch 369 at the coil 365. This will maintain the blocker 292 out of the way of the escapement mechanism, but it is independent of continued closure of the contacts 311 and 312.

In addition, the third cam-operated switch 203 carries the negative side of the battery from the line 402 to the line 432, whence it continues to the coil 375 of the truck relay 362, and thence by way of the line 400 back to the positive side of the battery.

The effect of this on the motor field winding is indicated in Fig. 60. The solenoid 362 being energized shunts the smaller resistor 353 and leaves the larger resistor 352 in series with the field. Consequently, the motor operates at a somewhat faster speed than before.

This circuit may be traced in detail by starting from the line 401 through the contacts 368 of the solenoid 360, the line 409, from bottom to top of the field winding 351, the line 408, the contacts 372, the line 406, upwardly through the contacts 382 of the solenoid 363, the line 410, the contacts 378 of the solenoid 362, the line 405, back to the upper end of the resistor 352, thence through that resistor to the motor 350, and by way of the lines 403 and 400 to the positive side of the battery. It will be seen that the effect, therefore, of energizing the solenoid 362 is to shunt the resistor 353.

If the operator moves the arm another notch on the indexing wheel, bringing the notch 96 thereof under the detent roller 103, there will be a similar additional displacement of the cams 153 and 154 regulated by the timing mechanism in precisely the same manner as previously described in connection with the establishment of second speed forward. When the time determined by the setting of the escapement mechanism has elapsed, the cams 153 and 154 will have moved so that the switch 200 remains closed, the switch 203 remains closed and the switch 204 is also closed. The ultimate effect of this is shown in Fig. 61, which illustration shows that the larger resistor 352 is now shunted, while the smaller resistor 353 is in circuit. This produces a faster operation of the motor.

The details of this circuit can be obtained by again taking Fig. 58, following the negative side of the battery through the line 401, the contacts 368 of the first relay 360, the line 409, the field winding 351 from bottom to top, the line 408, the contacts 372 of the relay 361, the line 406, the small resistor 353, the line 405, the contacts 378 of the relay 362, the line 410, the contacts 383 of the relay 363, the line 404 to the motor 350, and thence by way of the lines 403 and 400 to the positive side of the battery. This circuit, too, is dependent upon continued closure of the holding switch 369 of the relay 60.

In order to establish fourth speed forward, the actuating arm 70 is operated under another notch so as to bring the notch 97 in the index plate 90 under the detent wheel 103. This produces further displacement of the cam roller 142 and hence further displacement of the crank arm 145 and the pin 150 to further tighten the torsion spring 151. It again acts through the timing mechanism to produce an ultimate displacement of the cams 153 and 154 until the finger 155 on the cam 153 can again advance into reengagement with the upper end of the crank arm 145. The escapement mechanism in this operation determines the speed at which the cams 153 and 154 will follow the displacement of the arm.

When this position is obtained in the cams 153 and 154, the situation will be as indicated for fourth speed in the wiring diagram of Fig. 58. The switch 200 will remain closed, the switches 201 and 203 will be opened and the switch 204 will be closed. The switch 200 will again maintain its holding circuit to the relay 360, dependent upon continued closure of the switch 369. It will also continue to hold the coil 295 energized so that the timing mechanism may operate. Opening of the switch 203 releases the solenoid 362. Closure of the switch 204 establishes a circuit to the solenoid 363, from the line 402 as previously, through the line 433, to the coil 380 of the solenoid 360, and thence by the line 400 to the positive side of the battery. The effect of this is shown in Fig. 62. The solenoid 363 establishes a shunt circuit for both of the resistors 352 and 353.

Fig. 58 shows this circuit to be as follows: From the negative side of the battery through the line 401, the contacts 368 of the relay 360, the line 409, from the bottom to the top of the field winding 351, the line 408, the contacts 372 of the released relay 361, the line 406, the contacts 377 of the relay 362, the line 410, the contacts 383 of the relay 363, the line 404 back to the motor 350, and thence by way of the lines 403 and 400 to the positive side of the battery.

If the operator desires to slow the truck from a higher speed to a lower speed, without changing direction, or to return it to neutral position, he merely returns the lever 70 back to the chosen speed or to the neutral. The cams will immediately return from an advanced to a retarded position that does not involve a change of direction of the motor without having any actuation of the time delay mechanism, because the ratchet 241, 244 is designed to permit such return movement.

However, once the neutral position has been attained again and the operator moves the handle 70 beyond neutral in an opposite direction from a position formerly occupied, the timing mechanism will again come into effect between first and fourth speeds. This is true because, regardless of the direction obtained by the cam 167, the speed controlling cams 153 and 154 always are displaced in the same direction with respect to the upper shaft 64. This is true because the indexing cam 90 can displace the cam roller 142 and the linkage only outwardly or inwardly.

In order to operate in reverse, the operator moves the actuating arm 70 to the first notch to the opposite side of the neutral notch 91, which is the notch 93. As in the previously described manner, this will cause the cam 167 to move clockwise, viewed from the actuating arm end of the shaft 64, to displace the rise 216 under the switch 202 and to close the same, leaving the switch 205 open. This pre-disposes the circuit for operation of the motor in the chosen reverse direction. When thereafter first speed position of the lever in reverse is obtained, the cam-operated switches will assume the same positions they occupied for first speed forward. For example, when the switches 200 and 201 are closed, there will again be a circuit from the negative side of the battery through the line 402, the switch 200, the coil 295 and the line 421 back to the positive side of the battery, and also a connection through the line 422 that leads to the two now open switches 369 and 374. However, the switch 201 will establish a circuit from the line 402 through the line 430, and the switch 311, 312 closed by energization of the coil 295, and the line 424 to the line 423. This latter line now connects through the reverse switch 202 to the line 426 that leads to the coil 370 of the reverse directional relay 361, and thence by the line 400 back to the positive side of the battery. Consideration of the control circuits will show that all of the speed cam positions will establish exactly the same combinations of the relays 361, 362 and 363 that were previously made with the relays 360, 362 and 363. In other words, the only difference is that the relay 361 is energized for reverse; whereas the relay 360 is energized for forward speeds.

Energization of the relay 361, of course, closes the holding switch 374 instead of the holding switch 369.

The first speed reverse circuit is typical and is shown in Fig. 63 in brief. It will be seen that the closure of the solenoid 361 puts both of the resistors 352 and 353 in circuit, but the connections lead oppositely through the field winding to change the direction of the motor. This circuit may be traced in detail in Fig. 58 by taking the line 401 from the negative side of the battery to the contacts 373 of the relay 361, the line 408, entering the top of the field winding 351, the line 409 from the bottom thereof, the contacts 367 of the relay 360, the line 406, the two resistors 353 and 352, the motor 350, and the lines 403 and 400 to the positive side of the battery. Thus in the reverse circuits the current previously discussed moves from top to bottom of the field winding; whereas before it moved from bottom to top. This change is produced by energizing the relay 361 with the relay 360 deenergized in place of the opposite conditions.

If the operator, while moving rapidly in one direction, suddenly pulls the lever backwardly to position the control to cause the motor to operate in the other direction, a delay is interposed to prevent energizing the motor for reverse direction until it has slowed down and at least substantially stops.

This is obtained in the following manner: When the handle is neutralized, all of the cam-operated switches are open, and, as a result, all of the relays 360 through 363 at the truck are released to deenergize the motor 350. It has already been described that neither of the two relay coils 365 and 370 of the relays 360 and 361 can be energized solely by the closure of the cam-operated switch 200, because the circuit established thereby is dependent upon closure of the holding switches 369 and 370 that are closed only after the coils themselves are energized. Hence the function of the second cam-operated switch 201 is to establish an energizing circuit for the one or the other of these two coils, which can be done safely at low speed operation, and which energizing circuit is open at all speeds above first speed operation. But this energizing circuit through the switch 201 is dependent upon closure of the contacts 311 and 312 of the solenoid switch mechanism associated with the timing device.

The second coil 296 of this solenoid is a bucking coil that, when energized, reduces the power of the main coil 295 to a value too low to overcome the spring 317 and pull the switch blade over to close the contacts 311 and 312. Of course, when both coils 295 and 296 are deenergized, the spring causes the contacts 309 and 310 to be closed.

When the handle then is moved from a high speed position back to neutral, the coil 295 is deenergized so that the switch may drop back to close the contacts 309 and 310 and to open the contacts 311 and 312 in the initiating circuit. All the relay switches 360 through 363 are released. If the handle 70 is continued from neutral into an opposite speed position, it must actuate the switch 201 to closed position and must energize the coil 295 in a manner to pull the solenoid switch contacts 311 and 312 closed before either of the coils 360 and 361 can be energized. And if neither is energized, then the subsequent release of the switch 201 to establish a second, third or fourth speed position will be ineffective. (The only connection from the negative side of the battery into the truck control is by way of the line 401, and this line is broken unless one or the other of the coils 365 or 370 is energized.)

When the handle is rapidly returned to neutral from an advanced speed position, the motor 350 is driven by the truck and acts as a generator. With the control in the position previously described, the motor 350, acting as a generator, delivers current through a circuit including the line 435, the contacts 310 and 309, the coil 295, the line 421, the line 400 and the line 403 back to the motor. The motor driven at substantial speeds by the truck generates sufficient current to energize the bucking coil 296 adequately to prevent the coil 295 from pulling the relay switch over to close the contacts 311 and 312. This condition will obtain until the motor has slowed down at least a predetermined amount. The core of the solenoid 294 remains released, the timing mechanism remains blocked, and the starting circuit requiring closure of the contacts 311 and 312 cannot be energized. The operator is thus required to neutralize the handle from driving in one direction, and overtravel not beyond the first speed in the other direction, waiting then until the motor slows down sufficiently to let the solenoid act to establish the starting circuit for travel in the opposite direction.

The foot control crank 113 is capable of providing acceleration in either selected direction, and of neutralizing. As previously indicated, the indexing plate 90 has a cam protrusion 133 that holds the connection 131 of the foot latch lever 128 away from the cam roller 142 when the plate 90 is in neutral position. However, when the plate 90 has been moved in either direction far enough to select either forward or reverse, the connecting portion 131 can engage behind the cam roller 142. Thereafter, when the foot crank 113 is rocked to rock the shaft 67 clockwise, viewed from the handle end, the latch lever 128, urged over the roller 142 by the spring 134, will draw the cam roller 142 outwardly in the same direction it is driven by further advancing of the indexing plate 90 away from neutral position. This will obtain the same action of the speed control cams 153 and 154 that is obtained by the manual operation of the handle 70, but the indexing disc 90 will not move; nor will the shaft 64 move. The spring 141, acting upon the lever 139, opposes such displacement of the lever 139, so that release of the foot crank 113 will be followed by return of the arm 139 back to its initial position determined by the indexing cam. Of course, this will be followed by return of the speed control cams 153 and 154. By this arrangement, the operator may manually select the direction of travel, and thereafter obtain his speed by foot operation.

The foot operation further may completely neutralize the control, regardless of its having been positioned in some operating speed by a manual operation of the member 70, and consequent displacement of the indexing cam 90 and operation of the detent 103. If the operator moves the crank arm 113 counterclockwise, viewed from the handle end of the casing, he will move the detent release arm 123 upwardly. At a point high in the counterclockwise movement of the crank 113, the pin 124 will have so slid through the opening 109 on the ledge 108 of the detent arm 104 that the top of the loop portion of the lever 123 will engage the ledge 108 and cause a rocking of the member 104 to remove the wheel 103 from its notch in the indexing plate 90. When this occurs, the return spring mechanism, built around the coil spring 178, will immediately return the shaft 64 to its neutral position, followed by neutralizing of all of the switches. As soon as the foot crank 113 is released, the detent 103 will return.

The lost motion connection provided by the pin engaging in the slot 121 assures that a mere release of the foot pedal sufficiently far to cause the connection 131 on the latching lever 128 to engage over the cam roller 142 will not at the same time release the detent means.

It has previously been noted that the time delay mechanism does not operate in first speed forward or reverse. This provision is made so that the operator may make quick changes in direction of the truck, at low speeds, in order to warp the truck into a small space. Sudden reversals of direction of the motor at low speeds are not harmful, and the motor, when driven by the truck under such circumstances, does not generate enough current to operate the holding coil 296 to prevent the solenoid from pulling the switch in to close the contacts 311 and 312.

It will be seen that the control mechanism gives a very full and complete control for the operation of a motive means, in several speeds forward or backward, and provides a control that is particularly valuable in connection with trucks, such as are used in industrial capacities as within factories, railroad stations, and the like. It is extraordinarily compact, and in fact the casing illustrated is approximately nine inches tall by five inches wide by five inches deep. Its many desirable features appear from the foregoing description. While the over-all control is particularly valuable for reasons indicated, it will of course be understood that many of the component features are capable of more general use, and such general use is intended to be encompassed where possible by the language of the claims to follow.

What is claimed is:

1. In a mechanism of the kind described, a shaft, a crank arm supported on the shaft for movement about the shaft axis, a drivable member supported on the shaft for movement about the axis, a spring between the crank arm and the drivable member for applying force to the member when the arm is moved, urging the member to move in the same direction, an escapement mechanism, means connecting the escapement mechanism to the drivable member to retard movement thereof to a predetermined speed regardless of the speed of displacement of the arm, said connecting means including a lost motion device providing a predetermined amount of movement of the drivable member free of the escapement mechanism, upon initial movement of the crank arm.

2. In a speed changing device for a multi-speed motor or the like, an actuator movable to a plurality of positions, an actuatable device movable to corresponding positions, yieldable force means interconnecting the actuator and actuatable device, switch means operated by said actuatable device in its several positions, and time delay means connected with the actuator and the actuatable device to cause the actuatable device to follow movements of the actuator to corresponding positions, only after time delay, a second actuator, means connecting the second actuator with the yieldable force means, and means to render said connection ineffective in predetermined positions of the first named actuator.

3. In a speed changing device for a multi-speed motor or the like, an actuator movable to a plurality of positions, an actuatable device movable to corresponding positions, yieldable force means interconnecting the actuator and actuatable device, switch means operated by said actuatable device in its several positions, and time delay means connected with the actuator and the actuatable device to cause the actuatable device to follow movements of the actuator to corresponding positions, only after time delay, and means rendering the time delay means ineffective between predetermined positions of the actuator and actuatable device.

4. In a speed changing device, a multi-speed motor, an actuator movable to a plurality of positions corresponding to a plurality of speeds of the motor, an actuatable device movable to corresponding positions, yieldable force means interconnecting the actuator and actuatable device, switch means operated by said actuatable device in its several positions, and time delay means connected with the actuator and the actuatable device to cause the actuatable device to follow movements of the actuator to corresponding positions, only after time delay, and means rendering the time delay means ineffective between predetermined positions of the actuator and actuatable device, said predetermined positions corresponding to low speeds of the motor, the time delay means being effective in changing to high speeds.

5. In a control for a multi-speed motor, an actuator movable from a starting position through successive operating positions, an actuatable device movable to corresponding positions, low to high successive speed regulating switches operated by the actuatable device, connections between the actuator and actuatable device to cause the actuatable device to move with the actuator from starting position to the first operating position, and time delay mechanism to cause the actuatable device to move to a higher speed position beyond said first position only after predetermined time, regardless of the speed of movement of the actuator to a corresponding position.

6. In a control for a reversible multi-speed motor, an actuator movable from a starting position through successive operating positions, an actuatable device movable to corresponding positions, low to high successive speed regulating switches operated by the actuatable device, connections between the actuator and actuatable device to cause the actuatable device to move with the actuator from starting position to the first operating position, and time delay mechanism to cause the actuatable device to move to a higher speed position beyond said first position only after predetermined time, regardless of the speed of movement of the actuator to a corresponding position, and the actuator being oppositely movable in like manner for reverse operation, forward switch means operated by the movement of the actuator in its first named direction, and reverse switch means operated by the movement of the actuator in its reverse direction.

7. In a mechanism of the kind described, a shaft, a crank arm supported on the shaft for movement about the shaft axis, a drivable member supported on the shaft for movement about the axis, a spring between the crank arm and the drivable member for applying force to the member when the arm is moved, urging the member to move in the same direction, an escapement mechanism, means connecting the escapement mechanism to the drivable member to retard movement thereof to a predetermined speed regardless of the speed of displacement of the arm, and means operated by angular displacement of the shaft to move the crank arm.

8. In a mechanism of the kind described, a shaft, a crank arm supported on the shaft for movement about the shaft axis, a drivable member supported on the shaft for movement about the axis, a spring between the crank arm and the drivable member for applying force to the member when the arm is moved, urging the member to move in the same direction, an escapement mechanism, means connecting the escapement mechanism to the drivable member to retard movement thereof to a predetermined speed regardless of the speed of displacement of the arm, means operated by angular displacement of the shaft to move the crank arm, and detaining means yieldably maintaining the shaft in positions to which it is displaced.

9. In a mechanism of the kind described, a shaft, a crank arm supported on the shaft for movement about the shaft axis, a drivable member supported on the shaft for movement about the axis, a spring between the crank arm and the drivable member for applying force to the member when the arm is moved, urging the member to move in the same direction, an escapement mechanism, means connecting the escapement mechanism to the drivable member to retard movement thereof to a predetermined speed regardless of the speed of displacement of the arm, means operated by angular displacement of the shaft to move the crank arm, detaining means yieldably maintaining the shaft in positions to which it is displaced, and return means urging the shaft back to a starting position.

10. In a mechanism of the kind described, a shaft, a crank arm supported on the shaft for movement about the shaft axis, a drivable member supported on the shaft for movement about the axis, a spring between the crank arm and the drivable member for applying force to the member when the arm is moved, urging the member to move in the same direction, an escapement mechanism, means connecting the escapement mechanism to the drivable member to retard movement thereof to a predetermined speed regardless of the speed of displacement of the arm; means operated by angular displacement of the shaft to move the crank arm; detaining means yieldably maintaining the shaft in positions to which it is displaced; return means urging the shaft back to a starting position; and means to release the detaining means to permit the return means to return the shaft to starting position.

11. In a mechanism of the kind described, a shaft, a crank arm supported on the shaft for movement about the shaft axis, a drivable member supported on the shaft for movement about the axis, a spring between the crank arm and the drivable member for applying force to the member when the arm is moved, urging the member to move in the same direction, an escapement mechanism, means connecting the escapement mechanism to the drivable member to retard movement thereof to a predetermined speed regardless of the speed of displacement of the arm, means operated by angular displacement of the shaft to move the crank arm, detaining means yieldably maintaining the shaft in positions to which it is displaced, return means urging the shaft back to a starting position, and means to release the detaining means to permit the return means to return the shaft to starting position, the return means having less force than the detaining means, and means to adjust the force of at least one of them.

12. In a mechanism of the kind described, a shaft, a crank arm supported on the shaft for movement about the shaft axis, a drivable member supported on the shaft for movement about the axis, a spring between the crank arm and the drivable member for applying force to the member when the arm is moved, urging the member to move in the same direction, an escapement mechanism, means connecting the escapement mechanism to the drivable member to retard movement thereof to a predetermined speed regardless of the speed of displacement of the arm, means operated by angular displacement of the shaft to move the crank arm, detaining means yieldably maintaining the shaft in positions to which it is displaced, return means urging the shaft back to a starting position, and means to release the detaining means to permit the return means to return the shaft to starting position, and means separate from the actuator to release the detaining means.

13. In a control of the kind described, a first actuator movable to a plurality of positions, detent means yieldably maintaining the actuator in each of said positions, an operable device movable by said actuator to a plurality of positions corresponding to those of the actuator, a second actuating device for operating the operable device, and connected to the operable device independently of said detent means.

14. In a control of the kind described, a first actuator movable to a plurality of positions, detent means yieldably maintaining the actuator in its chosen position, an operable device, connections between the first actuator and the operable device including a movable member movable without displacing the detent means, for operating the operable device upon movement of the actuator to its several positions, and a second actuating means engageable with the movable member for moving the same, and the operable device, independently of the first actuator and the detent means.

15. In a control for a reversible motive means, direction selecting means to predetermine the direction of operation of the motive means, actuating means to operate the direction selecting means selectively for either forward or reverse operation of the motive means, said operating means being rapidly movable from a position to operate the selecting means to establish operation in one direction to a position to operate the selecting means to establish operation in the other direction, means operated by additional operation of the actuating means to operate speed increasing switches for the motive means, means in the control to prevent energization of the motive means for travel in the opposite direction, and other means to block operation of the speed increasing switches, when the operating means is thus rapidly shifted until the motive means has slowed down substantially in its travel in its initial direction.

16. In a control for a reversible motive means, direction selecting means to predetermine the direction of operation of the motive means, actuating means to operate the direction selecting means selectively for either forward or reverse operation of the motive means, said operating means being rapidly movable from a position to operate the selecting means to establish operation in one direction to a position to operate the selecting means to establish operation in the other direction, means operated by additional operation of the actuating means to operate speed increasing switches for the motive means, means in the control to prevent energization of the motive means for travel in the opposite direction, and other means to block operation of the speed increasing switches, when the operating means is thus rapidly shifted until the motive means has slowed down substantially in its travel in its initial direction, said means to control energization including a circuit branch adapted to be energized by the motive means acting as a generator, and means in said circuit branch to prevent closure of a circuit branch for travel of the motive means in the opposite direction.

17. In a control of the kind described, a reversible actuator operable to a plurality of successive positions in either direction from a neutral position, an operatable device operable to a plurality of successive positions corresponding to positions of the actuator, connecting means between the actuator and operatable device to cause the device to move as a result of movement of the actuator in either direction, the connecting means permitting relative movement between them, time delay means between the actuator and operatable device imposing a time period for operation of the operatable device into at least certain of its positions, regardless of the speed of operation of the actuator to a corresponding position, and direction selecting means operated by the initial movement of the actuator in each direction from neutral position.

18. In a control of the kind described, a reversible actuator operable to a plurality of successive positions in either direction from a neutral position, an operatable device operable to a plurality of successive positions corresponding to positions of the actuator, connecting means between the actuator and operatable device to cause the device to move as a result of movement of the actuator in either direction, the connecting means permitting relative movement between them, time delay means between the actuator and operatable device imposing a time period for operation of the operatable device into at least certain of its positions, regardless of the speed of operation of the actuator to a corresponding position, direction selecting means operated by the initial movement of the actuator in each direction from neutral position, a reversible multi-speed motor, switching means connected with the operatable device and operatable to obtain a plurality of speeds of the motor, the direction selecting means comprising switching mechanism to determine the direction of rotation of the motor, and means to prevent closure of the switching means when the actuator is moved from position obtaining motor operation in one direction to a position obtaining operation in the reverse direction, said means being operable until the speed of the motor in its initial direction has been reduced to a predetermined velocity.

19. In a control, a reversible motor, an actuator movable to forward and reverse positions, switch means operable by the actuator to effect operation of the motor, connections between the actuator and the switch means having a yieldable force mechanism permitting overtravel of the actuator relatively to the switch means but applying force urging operation of the switch means, blocker means to prevent operation of the switch means in a reverse direction when the actuator is moved from a forward position to a reverse position, coil means energizable to remove the blocker from blocking position, means to energize the coil means when the actuator is in forward or reverse position and to deenergize it when the actuator moves from one to the other, and means to reduce the power of the coil means, and means to energize the power reducing means when the motor is running in one direction and the actuator is shifted to position for motor operation in the opposite direction.

20. In a control, a reversible motor, an actuator movable to forward and reverse positions, switch means operable by the actuator to effect operation of the motor, connections between the actuator and the switch means having a lost motion mechanism permitting overtravel of the actuator relatively to the switch means, blocker means to prevent closure of the switch means in a reverse direction when the actuator is moved from a forward position to a reverse position, coil means energizable to remove the blocker from blocking position, means to energize the coil means when the actuator is in forward or reverse position and to deenergize it when the actuator moves from one to the other, and means to reduce the power of the coil means, circuit means for the coil means connected across the motor to be energized by the motor when the same acts as a generator.

21. In a control for a multi-speed motor, a plurality of actuating switches, a plurality of motor relay devices having coils and switches, an actuator for closing said switches in predetermined order for different positions of the actuator, a relay having a coil and a switch closed thereby, a first circuit branch including a first actuating switch and the relay coil, a second circuit branch including a second actuating switch, the relay switch and a first motor relay switch coil to operate the first motor switch and establish a first speed for the motor, an additional branch circuit including the first actuating switch and closed when the first motor switch coil is energized, a third circuit branch including a third actuating switch and a second motor relay coil, to establish a second motor speed circuit through both of said motor relay switches operated as aforesaid, the actuator being operable from starting position to first position to close the first and second actuating switches, and operable to second position to close the third actuating switch, open the second, and maintain the first closed, and thereby in said second position obtain a second speed circuit for the motor.

22. In a multispeed and reversible control, an actuating member, a plurality of speed changing control switches, forward and reverse switches, time delay means; the actuating member being movable to successive positions in opposite directions from a neutral position; means connecting the actuating member and the forward and reverse switch means to operate the forward switch upon movement of the actuating member from neutral in a forward direction, and to operate the reverse switch upon similar movement of the actuating member in a reverse direction; and means connecting the actuating member and the speed changing switches for actuation of the same successively by increased displacement of the actuating member in either direction from neutral position; and means interconnecting the time delay means with the actuating member and speed control switches to limit the rate at which the speed control switches may be successively operated in either direction.

23. The combination of claim 22, wherein there are at least two different speed control switches, and the means interconnecting the time delay means and the actuating member and the speed control switches including mechanism to render it ineffective until the first speed control switch is operated.

24. The combination of claim 22, wherein there is a second actuating member movable from a starting position in only one direction and back, means interconnecting it with the speed control switches, and means to prevent it from being operable upon the speed control switches until the first actuating member has been displaced to operate one of the forward and reverse switches.

ELISABETH B. PERSONS,
*Administratrix of the estate of Lawrence M. Persons, deceased.*

References Cited in the file of this patent

UNITED STATES PATENTS

| Number | Name | Date |
|---|---|---|
| 724,611 | Potter | Apr. 7, 1903 |
| 748,635 | Muschenheim et al. | Jan. 5, 1904 |
| 772,067 | Sundh | Oct. 11, 1904 |
| 777,883 | Carichoff | Dec. 20, 1904 |
| 798,160 | Carichoff | Aug. 29, 1905 |
| 891,236 | Dillon | June 23, 1908 |
| 904,765 | Eastwood | Nov. 24, 1908 |
| 991,206 | Horton | May 2, 1911 |
| 1,208,753 | Decker | Dec. 19, 1916 |
| 1,292,599 | Hall | Jan. 28, 1919 |
| 1,473,971 | Petersen | Nov. 13, 1923 |
| 1,548,764 | Sloane | Aug. 4, 1925 |
| 1,591,250 | Van Duyne | July 6, 1926 |
| 1,770,723 | Wyman | July 15, 1930 |
| 1,814,799 | Hardesty | July 14, 1931 |
| 1,940,930 | Wyman | Dec. 26, 1933 |
| 2,114,196 | Tritle et al. | Apr. 12, 1938 |
| 2,140,564 | Stoner | Dec. 20, 1938 |
| 2,227,133 | Hall | Dec. 31, 1940 |
| 2,394,111 | Schaelchlin et al. | Feb. 5, 1946 |